United States Patent
Sumioka et al.

(10) Patent No.: US 9,594,148 B2
(45) Date of Patent: Mar. 14, 2017

(54) ESTIMATION DEVICE AND ESTIMATION METHOD USING SOUND IMAGE LOCALIZATION PROCESSING

(71) Applicant: FUJITSU LIMITED, Kawasaki-shi, Kanagawa (JP)

(72) Inventors: Motoshi Sumioka, Kawasaki (JP); Kazuo Sasaki, Kobe (JP)

(73) Assignee: FUJITSU LIMITED, Kawasaki (JP)

( * ) Notice: Subject to any disclaimer, the term of this patent is extended or adjusted under 35 U.S.C. 154(b) by 558 days.

(21) Appl. No.: 13/927,599

(22) Filed: Jun. 26, 2013

(65) Prior Publication Data

US 2014/0050053 A1 Feb. 20, 2014

(30) Foreign Application Priority Data

Aug. 15, 2012 (JP) .................. 2012-180136

(51) Int. Cl.
*G01S 3/80* (2006.01)
*G09B 5/06* (2006.01)
*G01C 21/20* (2006.01)

(52) U.S. Cl.
CPC ............... *G01S 3/80* (2013.01); *G01C 21/20* (2013.01); *G09B 5/06* (2013.01)

(58) Field of Classification Search
CPC . G01S 11/14; G01S 11/04; G01S 3/80; G09C 21/20
See application file for complete search history.

(56) References Cited

U.S. PATENT DOCUMENTS

| | | | |
|---|---|---|---|
| 6,011,526 A | 1/2000 | Toyoshima et al. | |
| 2008/0228299 A1 | 9/2008 | Ikeda et al. | |
| 2009/0022368 A1 | 1/2009 | Matsuoka et al. | |
| 2009/0286600 A1 | 11/2009 | Hideya | |
| 2010/0057571 A1* | 3/2010 | Yamamoto et al. | 705/14.58 |
| 2010/0329479 A1* | 12/2010 | Nakadai et al. | 381/92 |
| 2012/0182429 A1* | 7/2012 | Forutanpour | H04R 3/005 348/175 |

FOREIGN PATENT DOCUMENTS

| | | |
|---|---|---|
| JP | 6-86400 | 3/1994 |
| JP | 9-160546 | 6/1997 |
| JP | 9-284676 | 10/1997 |
| JP | 2000-194460 | 7/2000 |
| JP | 2005-20455 | 1/2005 |
| JP | 2006-140674 | 6/2006 |
| JP | 2007-158619 | 6/2007 |
| JP | 2007-330578 | 12/2007 |
| JP | 2008-226400 | 9/2008 |
| WO | 2007/105792 A1 | 9/2007 |

OTHER PUBLICATIONS

Japanese Office Action dated Sep. 8, 2015 in corresponding Japanese Patent Application No. 2012-180136.

* cited by examiner

*Primary Examiner* — Luke Ratcliffe
*Assistant Examiner* — Hovahannes Baghdasaryan
(74) *Attorney, Agent, or Firm* — Staas & Halsey LLP

(57) ABSTRACT

A computer-readable recording medium storing an estimation program for causing a computer to execute a process, the process includes: executing sound image localization processing for each of pieces of sound data output by a plurality of sound sources; and specifying, on the basis of a change in orientation of a listener caused in accordance with the sound image localization processing, at least one of the plurality of sound sources related to the listener.

18 Claims, 33 Drawing Sheets

FIG. 6

| USER ID | X COORDINATE VALUE | Y COORDINATE VALUE | HORIZONTAL DIRECTION HISTORY | VERTICAL DIRECTION HISTORY |
|---|---|---|---|---|
| AAA | | | | |
| | | | | |
| | | | | |

FIG. 7

| USER ID | PROCESSING STATE | INTEREST TARGET |
|---|---|---|
| AAA | SUBJECT OF INTEREST | |
| | | |

| SOUND SOURCE ID | X COORDINATE VALUE | Y COORDINATE VALUE | EXHIBIT CONTENTS |
|---|---|---|---|
| EXHIBITION 1 | 14.6 | 6.2 | AUTOMOBILE, BATTERY CHARGING, CLOUD, CEMS |
| EXHIBITION 2 | 7.1 | 8.1 | SENSOR, ACCELERATION, GYRO |
| ⋮ | ⋮ | ⋮ | ⋮ |

FIG. 10

| USER ID | SOUND SOURCE ID | DIRECTION |
|---------|-----------------|-----------|
| AAA | EXHIBITION 1 | |
| AAA | EXHIBITION 2 | |
| ⋮ | ⋮ | ⋮ |

| DIRECTION | THRESHOLD |
|---|---|
| 0 | 40 |
| 30 | 30 |
| 60 | 20 |
| 90 | 15 |

| USER ID | PROCESSING STATE |
|---|---|
| AAA | INITIAL STATE |

| USER ID | X COORDINATE VALUE | Y COORDINATE VALUE | DIRECTION |
|---|---|---|---|
| AAA | 20.6 | 20.9 | 0 |

| SOUND SOURCE ID | X COORDINATE VALUE | Y COORDINATE VALUE |
|---|---|---|
| EXHIBITION 1 | 4.9 | 17.2 |
| EXHIBITION 2 | 1.9 | 18.0 |
| EXHIBITION 3 | 21.9 | 7.5 |
| EXHIBITION 4 | 27.6 | 7.5 |
| EXHIBITION 5 | 11.2 | 17.3 |
| EXHIBITION 6 | 4.5 | 12.1 |
| EXHIBITION 7 | 11.0 | 12.1 |
| EXHIBITION 8 | 42.9 | 8.2 |
| EXHIBITION 9 | 42.9 | 20.2 |

| USER ID | SOUND SOURCE ID | DIRECTION |
|---|---|---|
| AAA | EXHIBITION 1 | 342 |
| AAA | EXHIBITION 2 | 280 |
| AAA | EXHIBITION 3 | 10 |
| AAA | EXHIBITION 4 | 22 |
| AAA | EXHIBITION 5 | 288 |
| AAA | EXHIBITION 6 | 292 |
| AAA | EXHIBITION 7 | 301 |
| AAA | EXHIBITION 8 | 40 |
| AAA | EXHIBITION 9 | 82 |

| USER ID | PROCESSING STATE |
|---|---|
| AAA | EXPANSION STATE |

| USER ID | X COORDINATE VALUE | Y COORDINATE VALUE | DIRECTION |
|---|---|---|---|
| AAA | 20.6 | 20.9 | 10 |

| SOUND SOURCE ID | X COORDINATE VALUE | Y COORDINATE VALUE |
|---|---|---|
| EXHIBITION 1 | 4.9 | 17.2 |
| EXHIBITION 2 | 1.9 | 18.0 |
| EXHIBITION 3 | 21.9 | 7.5 |
| EXHIBITION 4 | 27.6 | 7.5 |
| EXHIBITION 5 | 11.2 | 17.3 |
| EXHIBITION 6 | 4.5 | 12.1 |
| EXHIBITION 7 | 11.0 | 12.1 |
| EXHIBITION 8 | 42.9 | 8.2 |
| EXHIBITION 9 | 42.9 | 20.2 |

| USER ID | SOUND SOURCE ID | DIRECTION |
|---|---|---|
| AAA | EXHIBITION 1 | 330-10 |
| AAA | EXHIBITION 2 | |
| AAA | EXHIBITION 3 | 10-10 |
| AAA | EXHIBITION 4 | 50-10 |
| AAA | EXHIBITION 5 | |
| AAA | EXHIBITION 6 | |
| AAA | EXHIBITION 7 | 300-10 |
| AAA | EXHIBITION 8 | 80-10 |
| AAA | EXHIBITION 9 | |

| USER ID | PROCESSING STATE |
|---|---|
| AAA | EXPANSION STATE |

| USER ID | X COORDINATE VALUE | Y COORDINATE VALUE | DIRECTION |
|---|---|---|---|
| AAA | 20.6 | 20.9 | 50 |

| SOUND SOURCE ID | X COORDINATE VALUE | Y COORDINATE VALUE |
|---|---|---|
| EXHIBITION 1 | 4.9 | 17.2 |
| EXHIBITION 2 | 1.9 | 18.0 |
| EXHIBITION 3 | 21.9 | 7.5 |
| EXHIBITION 4 | 27.6 | 7.5 |
| EXHIBITION 5 | 11.2 | 17.3 |
| EXHIBITION 6 | 4.5 | 12.1 |
| EXHIBITION 7 | 11.0 | 12.1 |
| EXHIBITION 8 | 42.9 | 8.2 |
| EXHIBITION 9 | 42.9 | 20.2 |

| USER ID | SOUND SOURCE ID | DIRECTION |
|---|---|---|
| AAA | EXHIBITION 1 | 330-50 |
| AAA | EXHIBITION 2 | |
| AAA | EXHIBITION 3 | 10-50 |
| AAA | EXHIBITION 4 | 50-50 |
| AAA | EXHIBITION 5 | |
| AAA | EXHIBITION 6 | |
| AAA | EXHIBITION 7 | 300-50 |
| AAA | EXHIBITION 8 | 80-50 |
| AAA | EXHIBITION 9 | |

| USER ID | PROCESSING STATE |
|---|---|
| AAA | SOUND SOURCE MOVING STATE |

| USER ID | X COORDINATE VALUE | Y COORDINATE VALUE | DIRECTION |
|---|---|---|---|
| AAA | 20.6 | 20.9 | 50 |

| SOUND SOURCE ID | X COORDINATE VALUE | Y COORDINATE VALUE |
|---|---|---|
| EXHIBITION 1 | 4.9 | 17.2 |
| EXHIBITION 2 | 1.9 | 18.0 |
| EXHIBITION 3 | 21.9 | 7.5 |
| EXHIBITION 4 | 27.6 | 7.5 |
| EXHIBITION 5 | 11.2 | 17.3 |
| EXHIBITION 6 | 4.5 | 12.1 |
| EXHIBITION 7 | 11.0 | 12.1 |
| EXHIBITION 8 | 42.9 | 8.2 |
| EXHIBITION 9 | 42.9 | 20.2 |

| USER ID | SOUND SOURCE ID | DIRECTION |
|---|---|---|
| AAA | EXHIBITION 1 | 320-50 |
| AAA | EXHIBITION 2 | |
| AAA | EXHIBITION 3 | 350-50 |
| AAA | EXHIBITION 4 | 30-50 |
| AAA | EXHIBITION 5 | |
| AAA | EXHIBITION 6 | |
| AAA | EXHIBITION 7 | |
| AAA | EXHIBITION 8 | 60-50 |
| AAA | EXHIBITION 9 | 90-50 |

| USER ID | PROCESSING STATE |
|---|---|
| AAA | SOUND SOURCE MOVING STATE |

| USER ID | X COORDINATE VALUE | Y COORDINATE VALUE | DIRECTION |
|---|---|---|---|
| AAA | 20.6 | 20.9 | 30 |

| SOUND SOURCE ID | X COORDINATE VALUE | Y COORDINATE VALUE |
|---|---|---|
| EXHIBITION 1 | 4.9 | 17.2 |
| EXHIBITION 2 | 1.9 | 18.0 |
| EXHIBITION 3 | 21.9 | 7.5 |
| EXHIBITION 4 | 27.6 | 7.5 |
| EXHIBITION 5 | 11.2 | 17.3 |
| EXHIBITION 6 | 4.5 | 12.1 |
| EXHIBITION 7 | 11.0 | 12.1 |
| EXHIBITION 8 | 42.9 | 8.2 |
| EXHIBITION 9 | 42.9 | 20.2 |

| USER ID | SOUND SOURCE ID | DIRECTION |
|---|---|---|
| AAA | EXHIBITION 1 | 320-30 |
| AAA | EXHIBITION 2 | |
| AAA | EXHIBITION 3 | 350-30 |
| AAA | EXHIBITION 4 | 30-30 |
| AAA | EXHIBITION 5 | |
| AAA | EXHIBITION 6 | |
| AAA | EXHIBITION 7 | |
| AAA | EXHIBITION 8 | 60-30 |
| AAA | EXHIBITION 9 | 90-30 |

| USER ID | PROCESSING STATE |
|---|---|
| AAA | SOUND SOURCE MOVING STATE |

| USER ID | X COORDINATE VALUE | Y COORDINATE VALUE | DIRECTION |
|---|---|---|---|
| AAA | 20.6 | 20.9 | 30 |

| SOUND SOURCE ID | X COORDINATE VALUE | Y COORDINATE VALUE |
|---|---|---|
| EXHIBITION 1 | 4.9 | 17.2 |
| EXHIBITION 2 | 1.9 | 18.0 |
| EXHIBITION 3 | 21.9 | 7.5 |
| EXHIBITION 4 | 27.6 | 7.5 |
| EXHIBITION 5 | 11.2 | 17.3 |
| EXHIBITION 6 | 4.5 | 12.1 |
| EXHIBITION 7 | 11.0 | 12.1 |
| EXHIBITION 8 | 42.9 | 8.2 |
| EXHIBITION 9 | 42.9 | 20.2 |

| USER ID | SOUND SOURCE ID | DIRECTION |
|---|---|---|
| AAA | EXHIBITION 1 | |
| AAA | EXHIBITION 2 | |
| AAA | EXHIBITION 3 | |
| AAA | EXHIBITION 4 | 30-30 |
| AAA | EXHIBITION 5 | |
| AAA | EXHIBITION 6 | |
| AAA | EXHIBITION 7 | |
| AAA | EXHIBITION 8 | |
| AAA | EXHIBITION 9 | |

| USER ID | PROCESSING STATE |
|---|---|
| AAA | EXPANSION STATE |

| USER ID | X COORDINATE VALUE | Y COORDINATE VALUE | DIRECTION |
|---|---|---|---|
| AAA | 20.6 | 20.9 | 50 |

| SOUND SOURCE ID | X COORDINATE VALUE | Y COORDINATE VALUE |
|---|---|---|
| EXHIBITION 1 | 4.9 | 17.2 |
| EXHIBITION 2 | 1.9 | 18.0 |
| EXHIBITION 3 | 21.9 | 7.5 |
| EXHIBITION 4 | 27.6 | 7.5 |
| EXHIBITION 5 | 11.2 | 17.3 |
| EXHIBITION 6 | 4.5 | 12.1 |
| EXHIBITION 7 | 11.0 | 12.1 |
| EXHIBITION 8 | 42.9 | 8.2 |
| EXHIBITION 9 | 42.9 | 20.2 |

| USER ID | SOUND SOURCE ID | DIRECTION |
|---|---|---|
| AAA | EXHIBITION 1 | |
| AAA | EXHIBITION 2 | |
| AAA | EXHIBITION 3 | 340-50 |
| AAA | EXHIBITION 4 | 10-50 |
| AAA | EXHIBITION 5 | |
| AAA | EXHIBITION 6 | |
| AAA | EXHIBITION 7 | |
| AAA | EXHIBITION 8 | 50-50 |
| AAA | EXHIBITION 9 | 90-50 |

136

ESTIMATION DEVICE AND ESTIMATION METHOD USING SOUND IMAGE LOCALIZATION PROCESSING

CROSS-REFERENCE TO RELATED APPLICATION

This application is based upon and claims the benefit of priority of the prior Japanese Patent Application No. 2012-180136, filed on Aug. 15, 2012, the entire contents of which are incorporated herein by reference.

FIELD

The embodiment discussed herein is related to a medium in which an estimation program is stored, an estimation device, and an estimation method.

BACKGROUND

For example, at a large scale exhibition site where exhibits are explained in parallel in a plurality of exhibit locations, a visitor usually refers to a layout map of the exhibition site included in a distributed pamphlet or the like to find a desired exhibit location that the visitor wants to visit.

However, in order for a visitor to move to the desired exhibit location by referring to the layout map, it is necessary for the visitor to think as to which point of the layout map his or her current position corresponds to and to which direction of the layout map the direction in which he or she faces corresponds to.

Information provided in the pamphlet is static information. Thus, for example, when there is a plurality of exhibit locations where exhibition objects of similar themes are exhibited, it might be difficult to specify in the pamphlet an exhibit location where an exhibit, in which the visitor is interested, is currently being explained.

There are also cases where the visitor listens to sounds coming from the exhibit locations and moves toward the location from which the sound including an exhibit in which the visitor is interested in comes from. That is, the visitor may move to a desired exhibit location using the auditory sense, not the visual sense.

The related art is described, for example, in Japanese Laid-open Patent Publication No. 2000-194460 and Japanese Laid-open Patent Publication No. 2005-20455.

SUMMARY

According to an aspect of the invention, a computer-readable recording medium storing an estimation program for causing a computer to execute a process, the process includes: executing sound image localization processing for each of pieces of sound data output by a plurality of sound sources; and specifying, on the basis of a change in orientation of a listener caused in accordance with the sound image localization processing, at least one of the plurality of sound sources related to the listener.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a table illustrating an example configuration of a user information storage section;

FIG. 7 is a table illustrating an example configuration of a state storage section;

FIG. 9 is a table illustrating an example configuration of an exhibit location information storage section;

FIG. 10 is a table illustrating an example configuration of a sound source direction storage section;

FIG. 16 is a table illustrating an example configuration of an acoustic resolution characteristic storage section;

FIG. 20A, FIG. 20B, FIG. 20C, FIG. 20D, FIG. 20E, and FIG. 20F are diagrams illustrating an example initial state;

FIG. 21A, FIG. 21B, FIG. 21C, FIG. 21D, and FIG. 21E are a first group of diagrams illustrating an example expansion state;

FIG. 22A, FIG. 22B, FIG. 22C, FIG. 22D, and FIG. 22E are a second group of diagrams illustrating an example expansion state;

FIG. 23A, FIG. 23B, FIG. 23C, FIG. 23D, and FIG. 23E are a first group of diagrams illustrating an example sound source moving state;

FIG. 24A, FIG. 24B, FIG. 24C, FIG. 24D, and FIG. 24E are a second group of diagrams illustrating an example sound source moving state;

FIG. 25A, FIG. 25B, FIG. 25C, FIG. 25D, and FIG. 25E are a first group of diagrams illustrating an example of shift from the sound source moving state to the expansion state; and FIG. 26A, FIG. 26B, FIG. 26C, FIG. 26D, and FIG. 26E are a second group of diagrams illustrating an example of shift from the sound source moving state to the expansion state.

DESCRIPTION OF EMBODIMENTS

In an exhibition site in which a number of exhibit locations are located close to one another, sounds from the plurality of exhibit locations are heard simultaneously. Thus, it might be difficult for a visitor to distinguish each sound source direction. Also, there is a probability that a sound comes from a different direction than the direction of the sound source thereof due to reflection of the sound in the exhibition site and the like.

Therefore, the present inventor focused on whether a visitor may be guided by a virtual sound generated by utilizing sound source localization technology that uses a head-related transfer function. However, unless the sound source in which the visitor is interested is specified, it is difficult to guide the visitor to the correct direction.

For an embodiment of the present technology, an objective to enable estimation of a sound source in which a listener is interested among a plurality of sound sources.

Figure 1:
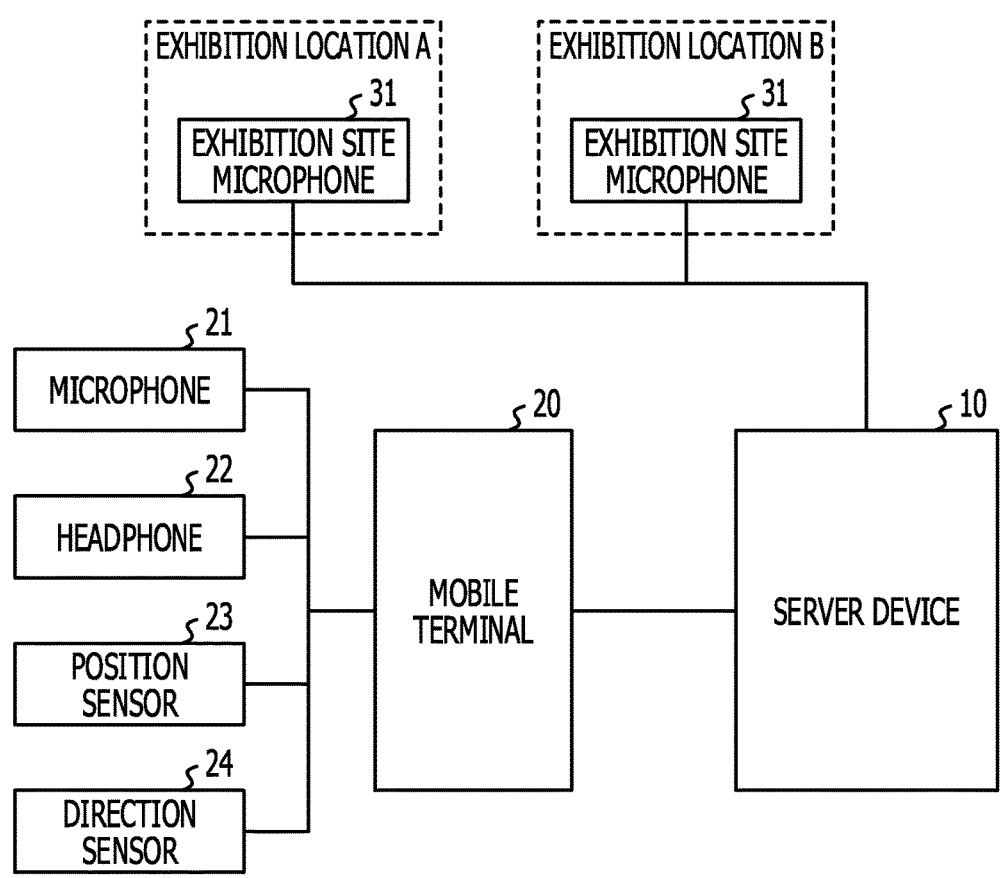
FIG. 1 is a block diagram illustrating an example system configuration according to an embodiment.

An embodiment of the present invention will be described below with reference to the accompanying drawings. FIG. 1 is a block diagram illustrating an example system configuration according to the present embodiment. In FIG. 1, a server device 10 is connected to an exhibition site microphone 31 provided at each exhibit location at an exhibition site via an information communication network, such as a wireless local area network (LAN), a wire LAN, or the like. Also, the server device 10 may communicate with one or more mobile terminals 20 via a wireless communication network, such as a wireless LAN or so forth.

In the present embodiment, the term "exhibition site" means a facility that includes a plurality of exhibit locations. The term "exhibit location" means a single segment in the exhibition site, such as a booth, in which explanation about the exhibit in the corresponding exhibit location is given by an explainer. Each exhibition site microphone 31 includes an electronic component that converts the voice of the explainer into an electric signal and an electronic component that digitalizes the electric signal of the sound and transfers the digitalized sound data to the server device 10 via the information communication network. The exhibition site microphone 31 transfers the sound data, which includes identification information (hereinafter referred to as a "sound source ID") of each exhibit location, to the server device 10. The sound data is controlled, for example, using the Session Initiation Protocol (SIP), the Real Time Streaming Protocol (RTSP), or another communication protocol, and is transferred in a streaming format, such as via the Real-time Transport Protocol (RTP) or the like, to the server device 10. Note that digitalization of the electric signal of the sound may be performed in the server device 10. In this case, the sound signal may be transferred to the server device 10.

A mobile terminal 20 is a mobile information processing device that a visitor to the exhibition site uses. Examples of the mobile terminal 20 include a mobile phone, a smart phone, a personal digital assistance (PDA), a tablet-type device, and so forth. In FIG. 1, a microphone 21, a headphone 22, a location sensor 23, a direction sensor 24, and so forth are connected to the mobile terminal 20 or are housed in the mobile terminal 20. The microphone 21 converts the voice of the "user of the mobile terminal 20" (which will be hereinafter merely referred to as the "user") into a sound signal. The headphone 22 is set so as to cover both ears of the user and serves as a multichannel (two or more channels) small speaker that plays back sound data for each exhibit location transferred from the server device 10. Earphones or so forth, which are speakers other than the headphone 22, may be used, as long as the speaker is able to play back a sound to both of the ears of the user.

The location sensor 23 measures the location of the mobile terminal 20. The location sensor 23 may be a global positioning system (GPS) sensor and may also be a sensor capable of detecting coordinate values in a coordinate system for the exhibition site. For example, in a two-dimensional space in which the floor area of the exhibition site is a coordinate system, radio frequency identification (RFID) tags each of which store coordinate values may be disposed along an X axis and a Y axis in a lattice pattern. In this case, the location sensor 23 may be an RFID reader that reads out the coordinate values stored in each RFID tag. The coordinate system of coordinate values measured or detected by the location sensor 23 will be hereinafter referred to as an "exhibition site coordinate system". The exhibition site coordinate system is a coordinate system that includes direction. In the present embodiment, direction in the exhibition site coordinate system is represented by a value ranging from 0 to 360 degrees in a clockwise direction, with the positive direction parallel to the Y axis as 0 degrees and centered on the position of the user.

The direction sensor 24 measures the orientation of the user. The orientation of the user means the direction (that is, the angle from 0 degrees) in which the face of the user faces in the exhibition site coordinate system. The direction sensor 24 may preferably measure not only the angle in the horizontal direction but also the angle in the vertical direction. This is to enable detection of a nod of the user and so forth. For the same reason, the direction sensor 24 is preferably installed in the headphone 22. However, when the user performs manual input with respect to the mobile terminal 20 to select or so forth a sound source in which the user is interested in, the direction sensor 24 may be incapable of measuring the angle in the vertical direction. In this case, the direction sensor 24 may be installed not in the headphone 22 but in a location in which the orientation of the user may be measured.

The server device 10 is a computer that provides a service of guiding the user towards the direction of the sound source in which the user is interested. The service provided by the server device 10 will be hereinafter referred to as a "guiding service". The server device 10 performs sound image localization processing for sound data or a sound signal transferred from an exhibition site microphone 31 and generates sound data with which the sound source of each exhibit location is able to be heard from a physically correct direction relative to the user, or a different direction from the physically correct direction. The sound data that has undergone sound image localization processing is transferred to the mobile terminal 20 and is output from the headphone 22. The purpose for causing the sound to be heard from the different direction from the physically correct direction is, as described below, to specify the sound source (that is the exhibit location) in which the user is interested. Note that the sound image localization processing is processing performed based on a virtual sound image localization technique that uses a head-related transfer function. The server device 10 estimates and specifies, based on an operation of listening to the sound which has undergone the sound image localization processing performed by the user, the sound image in which the user is interested, and guides the user in the direction of the specified sound image.

In the present embodiment based on the above-described system configuration, the outline of a method for specifying the sound source in which a user is interested will be described.

FIG. 2A, FIG. 2B, FIG. 2C, and FIG. 2D are diagrams illustrating the outline of a method for specifying a sound source in which a user is interested according to the present embodiment. As processing states of the server device 10, four processing states are illustrated in FIG. 2A, FIG. 2B, FIG. 2C, and FIG. 2D. In each processing state, the user is illustrated viewed from the top. In each of FIG. 2A, FIG. 2B, FIG. 2C, and FIG. 2D, a rectangle enclosing a number represents the position of a physical or actual sound source (that is, the location of an exhibit location). The value of each number is an identifier of the exhibit location. A circle enclosing a number represents the location of a sound source recognized by the user by hearing a sound output from the headphone 22. A sound source recognized by the sound output from the headphone 22 will be hereinafter referred to as a "virtual sound source".

Figure 2B:
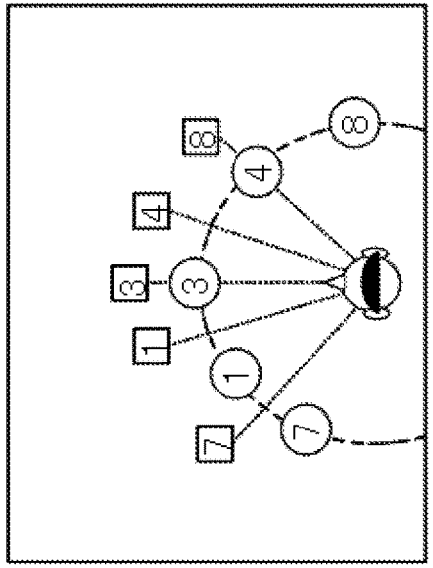
FIG. 2A, FIG. 2B, FIG. 2C, and FIG. 2D are diagrams illustrating the outline of a method for specifying a sound source, in which a user is interested, according to an embodiment.
Figure 2D:
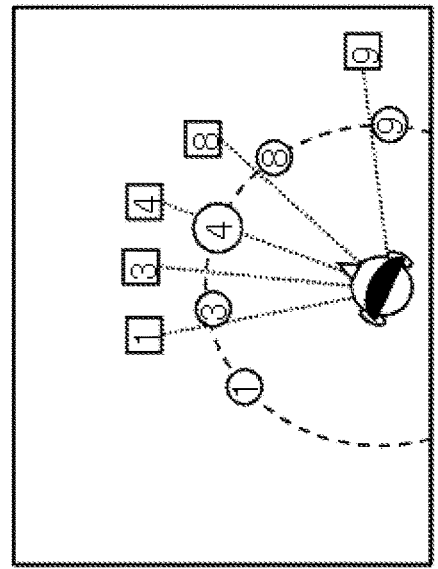
Figure 2A:
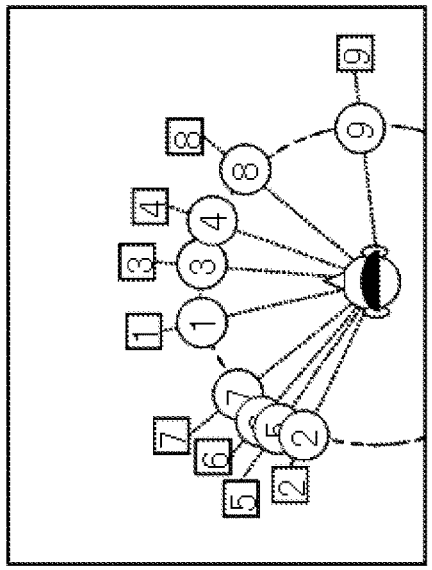

FIG. 2A illustrates an initial state. In the initial state, the direction of a virtual sound source viewed from the visitor corresponds to a corresponding physical sound source. In the initial state, when it is detected that the orientation of the user is fixed to the direction of one virtual sound source, the processing state of the server device 10 shifts to an expansion state of FIG. 2B. That is, when the orientation of the user has been substantially steady for a given time or more, the processing state shifts to the expansion state.

Figure 2C:
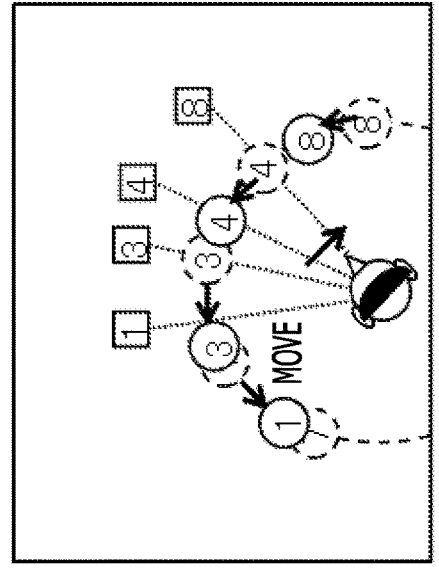

In the expansion state, with the user centered, in directions away from a virtual sound source closest to the orientation of the user, other virtual sound sources are expanded. In this case, an interval of a given angle or more is given between the directions of adjacent virtual sound sources. As a result, the user may easily distinguish one virtual sound source from another. FIG. 2B illustrates an example in which, in directions away from the virtual sound source 3 closest to the orientation of the user, the other virtual sound sources are expanded with the user centered. Thereafter, when it is detected that the orientation of the user is fixed to the direction of a different virtual sound source from the virtual sound source 3, the processing state of the server device 10 shifts to the sound source moving state of FIG. 2C. That is, in a situation (FIG. 2B) where each of the virtual sound sources may be caused to be easily distinguished from another, when the user is interested in a virtual sound source which is in a different direction from the direction in which the user originally faced and the user has faced the virtual sound source for a given time or more, the processing state of the server device 10 shifts to the sound source moving state (FIG. 2C).

In the sound source moving state, the direction of each virtual sound source slowly moves from the direction of the virtual sound source, which is relative to the orientation of the user, to the direction of the physical sound source. FIG. 2C illustrates an example where each virtual sound source moves from being relative to the virtual sound source 4 to being relative to the physical sound source 4.

When the orientation of the user follows the movement of the virtual sound source 4, the server device 10 estimates that the user is interested in the virtual sound source 4. That is, in FIG. 2C, the physical sound source 8 exists in the direction of the virtual sound source 4 before the movement begins. In this case, there is a probability that the user is interested in the exhibit location for the physical sound source 8 using the visual sense, not the auditory sense. The sound source moving state is a processing state used to determine whether the user is interested in the virtual sound source 4 using the auditory sense or the physical sound source 8 using the visual sense. Since the orientation of the user followed the movement of the virtual sound source 4, it is highly likely that the user is interested in the virtual sound source 4 using the auditory sense. Thus, in this case, the server device 10 estimates that the user is interested in the virtual sound source 4.

For example, when the virtual sound source 4 finishes moving in the direction of the physical sound source 4 so that the virtual sound source 4 corresponds to the direction of the physical sound source 4, the processing state shifts to the expansion state oriented on the virtual sound source 4. That is, with the user centered, the other virtual sound sources are expanded in directions away from the virtual sound source 4.

Thereafter, when the user nods facing in the direction of the virtual sound source 4, the processing state of the server device 10 shifts to the selection state of FIG. 2D. Note that, in the present embodiment, nodding corresponds to an operation to select a desirable virtual sound source. In the selection state, the virtual sound source 4 the closest to the direction the user faces is specified as the virtual sound source in which the user is interested. Thereafter, sound image localization processing is performed such that the virtual sound source 4 corresponds to the direction of the physical sound source 4. Thus, the user may arrive at the position of the physical sound source 4, that is, the exhibit location in which the user is interested, by moving depending on the direction of the virtual sound source 4.

Figure 3:
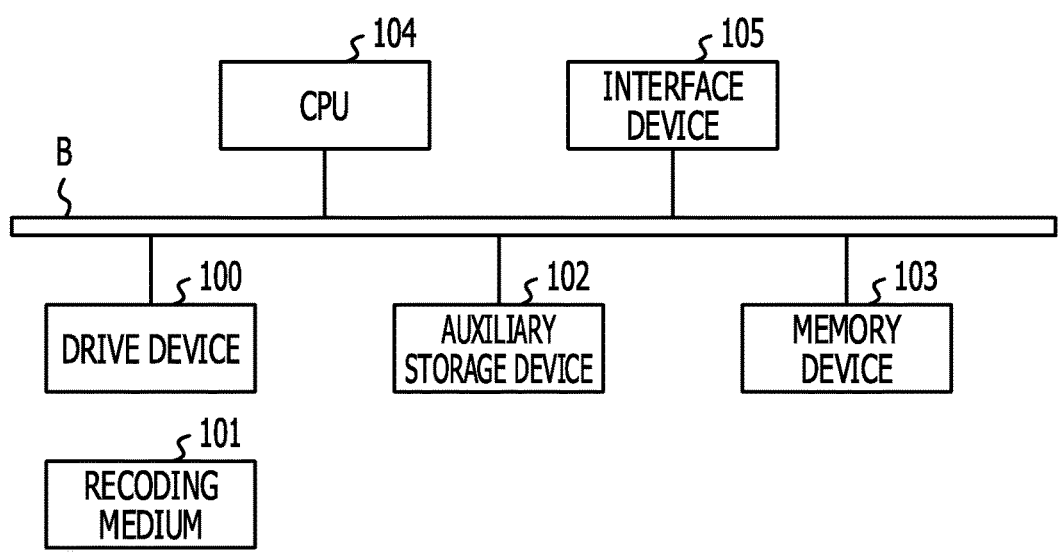
FIG. 3 is a block diagram illustrating an example hardware configuration of a server device according to an embodiment.

The server device 10, the mobile terminal 20, and so forth will be described in detail. FIG. 3 is a block diagram illustrating an example hardware configuration of a server device according to the present embodiment. The server device 10 of FIG. 3 includes a drive device 100, an auxiliary storage device 102, a memory device 103, a CPU 104, and an interface device 105, and so forth which are connected to one another via a bus B.

A program that realizes the processing in the server device 10 is provided by a recording medium 101. When the recording medium 101 in which the program is recorded is set in the drive device 100, the program is installed from the recording medium 101 to the auxiliary storage device 102 via the drive device 100. However, as another option other than installing the program from the recording medium 101, the program may be downloaded from another computer via a network. The auxiliary storage device 102 stores the installed program as well as a file, data, and so forth that are to be used.

When an instruction to start the program is given, the memory device 103 reads out the program from the auxiliary storage device 102 and then stores the program. The CPU 104 executes a function for the server device 10 in accordance with the program stored in the memory device 103. The interface device 105 is used as an interface to connect to the network.

Note that examples of the recording medium 101 include a transportable recording medium, such as a CD-ROM, a DVD disk, a USB memory, and so forth. Also, examples of the auxiliary storage device 102 include a hard disk drive (HDD), a flash memory, and so forth. Each of the recording medium 101 and the auxiliary storage device 102 corresponds to a computer-readable recording medium.

The mobile terminal 20 may have hardware similar to that of FIG. 3. However, the mobile terminal 20 may also include an input device that receives an input from a user, a display device that displays information, and so forth.

Figure 4:
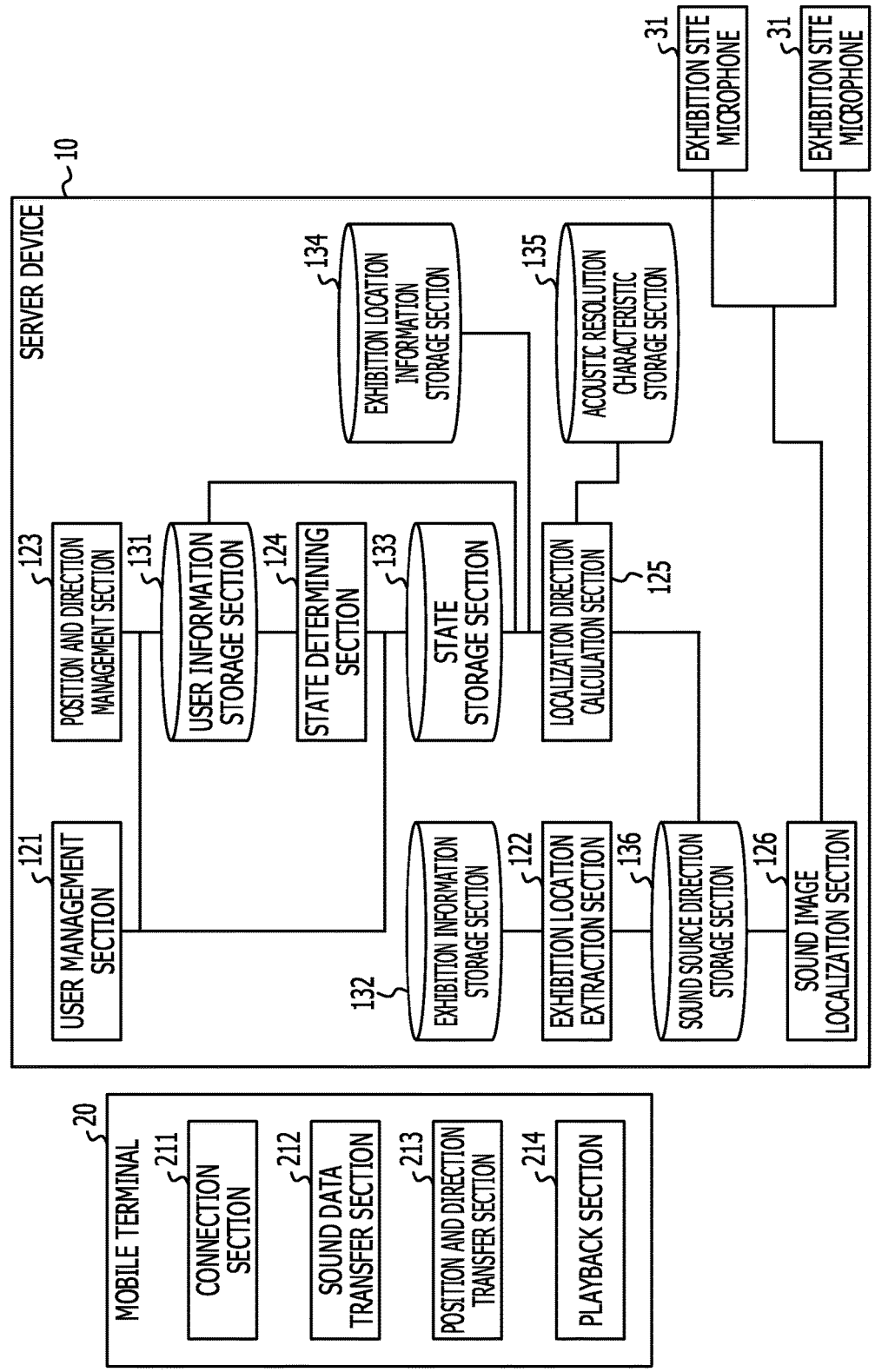
FIG. 4 is a block diagram illustrating an example functional configuration of a server device and a mobile terminal according to an embodiment.

FIG. 4 is a block diagram illustrating an example functional configuration of the server device and the mobile terminal according to the present embodiment. In FIG. 4, the mobile terminal 20 includes a connection section 211, a sound data transfer section 212, a position and direction transfer section 213, a playback section 214, and so forth. Each of the components is realized by processing which the program installed in the mobile terminal 20 causes the CPU of the mobile terminal 20 to execute.

The connection section 211 controls start, stop, and so forth for communication with the server device 10. The sound data transfer section 212 transfers the sound data of the voice of the user input from the microphone 21 to the server device 10. The position and direction transfer section 213 transfers position information input from the location sensor 23 and direction information input from the direction sensor 24 to the server device 10. The playback section 214 causes the headphone 22 to play back the sound data transferred from the server device 10. Note that the sound data is transferred from the server device 10, for example, by streaming.

The server device 10 includes a user management section 121, an exhibit location extracting section 122, a position and direction management section 123, a state determining section 124, a localization direction calculating section 125, a sound image localization section 126, and so forth. Each of the components is realized by processing which the program installed in the server device 10 causes the CPU 104 to execute. The server device 10 also uses a user information storage section 131, an exhibition information storage section 132, a state storage section 133, an exhibit location information storage section 134, an acoustic resolution characteristic storage section 135, a sound source direction storage section 136, and so forth. Each of the storage sections may be realized by using the memory device 103, the auxiliary storage device 102, or a storage device connected to the server device 10 via a network.

The user information storage section 131 stores position information, direction information, and so forth for each user (each mobile terminal 20). The exhibition information storage section 132 stores a character string and so forth indicating the exhibit contents for each exhibit location. The state storage section 133 stores processing states illustrated in FIG. 2A, FIG. 2B, FIG. 2C, and FIG. 2D for each user. The exhibit location information storage section 134 stores position information for each exhibit location. The acoustic resolution characteristic storage section 135 stores a threshold (a lower limit value) of an interval between adjacent virtual sound sources in the expansion state. That is, in the expansion state, expansion of the virtual sound sources is performed so that the interval between adjacent virtual sound sources is greater than or equal to the threshold. The sound source direction storage section 136 stores, for each combination of a user and a virtual sound source, a relative direction of each virtual sound source with respect to the orientation of the user.

In response to a connection request from the mobile terminal 20, the user management section 121 generates a record for the user of the mobile terminal 20 and stores the generated record in each of the user information storage section 131 and the state storage section 133. In response to a disconnection request from the mobile terminal 20, the user management section 121 deletes the record for the user of the mobile terminal 20 from each of the user information storage section 131 and the state storage section 133.

The exhibit location extracting section 122 refers to the exhibition information storage section 132 and then extracts an exhibit location associated with a keyword sent from the mobile terminal 20. The exhibit location extracting section 122 generates a record that includes a combination of identification information for the extracted exhibit location and an identifier for the user of the mobile terminal 20 and stores the generated record in the sound source direction storage section 136. A sound from the exhibit location, which is extracted by the exhibit location extracting section 122, is provided to the user.

The position and direction management section 123 receives position information and direction information transferred from the position and direction transfer section 213 of the mobile terminal 20 and stores the position information and direction information in the record for the user of the mobile terminal 20 in the user information storage section 131. The position information and the direction information of each user that the user information storage section 131 stores are updated from moment to moment.

The state determining section 124 determines, on the basis of information that the user information storage section 131 stores, the processing state for each user. When the processing state of a user is to be changed, the state determining section 124 updates the value of the processing state stored for the user in the state storage section 133.

The localization direction calculating section 125 calculates, for each user, a direction corresponding to the processing state for a virtual sound source corresponding to the exhibit location (physical sound source) extracted for the user by the exhibit location extracting section 122. The localization direction calculating section 125 stores the direction calculated for each virtual sound source in association with the corresponding virtual sound source in the sound source direction storage section 136.

The sound image localization section 126 executes, on the basis of the direction stored in the sound source direction storage section 136, sound image localization processing (sound source localization processing) for each sound source and outputs sound data as a result of the processing. The sound data output from the sound image localization section 126 is transferred to the mobile terminal 20, for example, by streaming, and is played back by the playback section 214.

Figure 5:
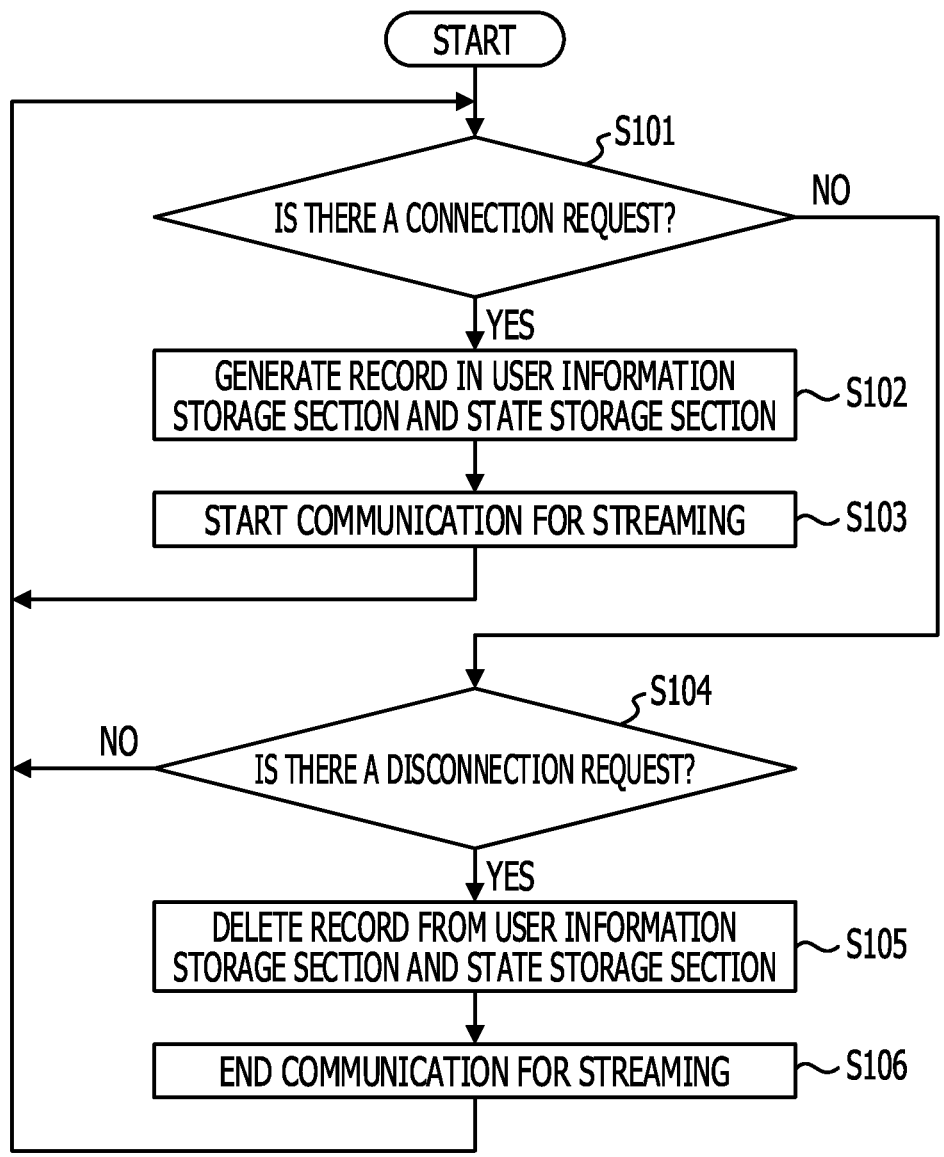
FIG. 5 is a flowchart illustrating an example of processing procedures that a user management section executes.

Processing procedures that the server device 10 executes will be hereinafter described. First, processing procedures that the user management section 121 executes will be described. FIG. 5 is a flowchart illustrating an example of processing procedures that a user management section executes.

The user management section 121 stands by to receive a connection request from the connection section 211 of the mobile terminal 20. When a connection request is received from one of a plurality of mobile terminals 20 (YES in S101), the user management section 121 generates a record corresponding to the mobile terminal 20 that made the connection request for each of the user information storage section 131 and the state storage section 133 (S102).

FIG. 6 is a table illustrating an example configuration of a user information storage section. In FIG. 6, the user information storage section 131 stores a user ID, an X coordinate value, a Y coordinate value, a horizontal direction history, a vertical direction history, and so forth for each user (each mobile terminal 20). The user ID is identification information for each user. For example, an IP address, a MAC address, or some other identification information of the mobile terminal 20 that the user has may be used as the user ID. The X coordinate value and the Y coordinate value are the X coordinate and the Y coordinate that indicate the position of the user in the exhibition site coordinate system. The horizontal direction history is a history over time of an angle indicating the orientation of the user on the XY plane of the exhibition site coordinate system. The vertical direction history is a history over time of an angle indicating the orientation of the user (that is, a tilt of the head of the user) in the vertical direction (the Z axis direction in the exhibition site coordinate system).

In Step S102, the user ID is stored in the newly generated record. The user ID may be included in the connection request from the mobile terminal 20 or may be allocated by the server device 10. When the server device 10 allocates the user ID, the allocated user ID may be included in a response to the connection request so as to be returned to the mobile terminal 20.

FIG. 7 is a table illustrating an example configuration of a state storage section. In FIG. 7, the state storage section 133 stores the user ID, the processing state, a subject of interest, and so forth for each user (each mobile terminal 20). The user ID is as described above. The processing state is the processing state of the server device 10 for the user corresponding to the user ID. As illustrated in FIG. 2A, FIG. 2B, FIG. 2C, and FIG. 2D, in the present embodiment, there are four processing states. The subject of interest is identification information of the virtual sound source in which the user is interested. In Step S102, the user ID and the processing state are stored in the newly generated record. The "initial state" is stored in the processing state.

Subsequently, the user management section 121 starts communication to stream sound data to the mobile terminal 20, which is a connection request source (S103). The communication is accessible from the sound image localization section 126. Note that, for the streaming communication protocol, a known communication protocol may be used.

However, when a disconnection request from one of the plurality of mobile terminals 20 is received (YES in S104), the user management section 121 deletes the record corresponding to the user ID specified in the disconnection request from the user information storage section 131 and the state storage section 133 (S105). Subsequently, the user management section 121 ends the communication to stream sound data to the mobile terminal 20 serving as a disconnection request source (S106).

Note that, when the user starts using the guide service of the server device 10, the user inputs, to the mobile terminal 20, an instruction to connect to the server device 10. In response to the instruction, the mobile terminal 20 sends a connection request to the server device 10. Also, when the user stops using the guide service of the server device 10, the user inputs, to the mobile terminal 20, an instruction to disconnect from the server device 10. In response to the instruction, the mobile terminal 20 sends a disconnection request to the server device 10.

For the mobile terminal 20 that is to be subject to processing in processing procedures described below, connection processing (Steps S102 and S103) has been completed.

Figure 8:
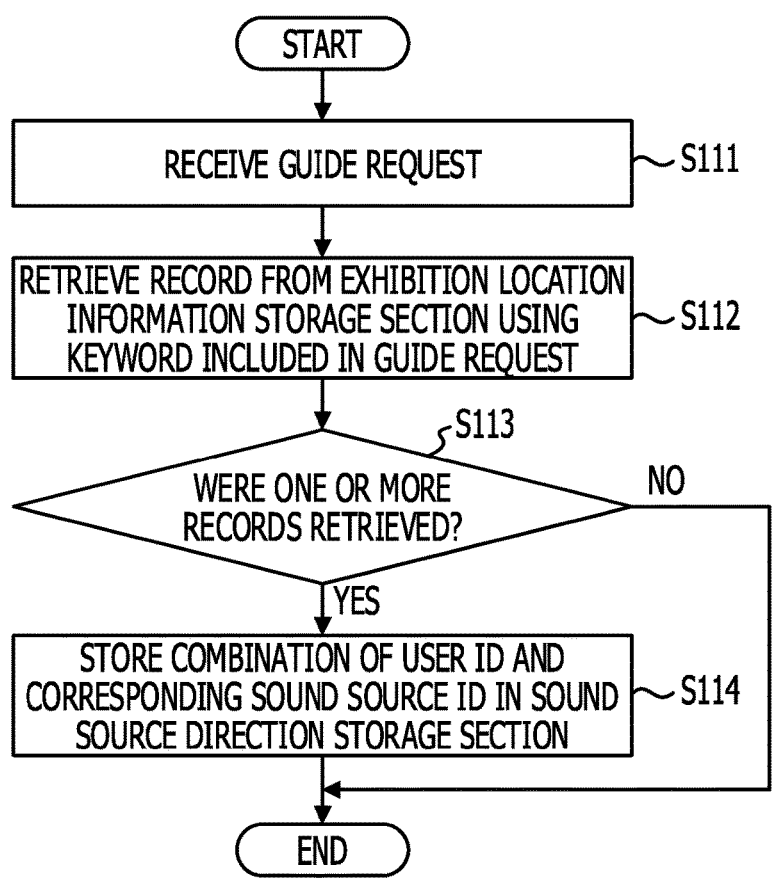
FIG. 8 is a flowchart illustrating an example of processing procedures that an exhibit location exhibit location extracting section executes.

Processing procedures that the exhibit location extracting section 122 executes will be subsequently described. FIG. 8 is a flowchart illustrating an example of processing procedures that an exhibit location extracting section executes.

In Step S111, the exhibit location extracting section 122 receives a guide request from the mobile terminal 20. The guide request includes the user ID and sound data containing a keyword indicating a subject that the user is interested in. That is, the user vocalizes a keyword which is related to the exhibit contents and which indicates the interest of the user to the microphone 21. The sound data transfer section 212 of the mobile terminal 20 sends, to the server device 10, the guide request that includes both the digital sound data obtained by digitalizing a sound signal input from the microphone 21 and the user ID.

Subsequently, the exhibit location extracting section 122 retrieves a record from the exhibit location information storage section 134 on the basis of the keyword that the sound data included in the guide request indicates (S112).

FIG. 9 is a table illustrating an example configuration of an exhibit location information storage section. In FIG. 9, the exhibit location information storage section 134 stores a sound source ID, an X coordinate value, a Y coordinate value, the exhibit contents, and so forth for each exhibit location. The sound source ID is identification information for each sound source. In the present embodiment, an exhibit location is a sound source, and thus, each exhibit location is identified by the sound source ID. An identification name of an exhibitor or so forth may be used as the sound source ID. The sound source ID is given to the sound data sent from each exhibition microphone 21. Accordingly, a sound ID given to sound data may be used to identify for which exhibit location each exhibition microphone 21, from which the sound data is taken, is associated with.

The X coordinate value and the Y coordinate value are the X coordinate and the Y coordinate that indicate the representative position of the exhibit location in the exhibition site coordinate system. The X coordinate value and the Y coordinate value may be registered in advance with the sound ID and the exhibit contents. Alternatively, a location sensor may be set in the exhibit location to automatically register the X coordinate value and the Y coordinate value on the basis of the position information input from the location sensor. The representative position of the exhibit location may be arbitrarily determined for each exhibit location, and alternatively, may be a position determined on the basis of unified criteria. The exhibit contents is a set of one or more character strings.

In Step S112, a record included in every "exhibit contents" is searched for a keyword that indicate an interest of the user. Note that a plurality of keywords may be specified. In this case, records that include all of the plurality of keywords in the "exhibit contents" may be a target to be searched for, and alternatively, a record including one of the plurality of keywords may be a target to be searched for. Also, a keyword indicated by sound data is extracted from the sound data by means of the exhibit location extracting section 122 analyzing the sound data. However, the keyword indicating the interest of the user may be included as text data in the guide request. For example, sound analysis may be performed at the mobile terminal 20 side and a sound may be converted into text data. As another alternative, the user may manually input text data indicating the keyword to the mobile terminal 20.

When no corresponding record is retrieved (NO in S113), the processing of FIG. 8 is ended. In this case, a request to re-enter a keyword may be returned to the mobile terminal 20.

When one or more records are retrieved (YES in S113), the exhibit location extracting section 122 stores a combination of the user ID included in the guide request and the sound source ID of each retrieved record in the sound source direction storage section 136 (S114).

FIG. 10 is a table illustrating an example configuration of a sound source direction storage section. In FIG. 10, each record of the sound source direction storage section 136 includes items, such as the user ID, the sound source ID, the direction, and so forth. The user ID is identification information for the user as described above. The sound source ID is identification information for the sound source as described above. The direction is a relative direction of the sound source (the exhibit location) concerning the sound source ID based on the orientation of the user in the current position of the user corresponding to the user ID. That is, the direction is a relative value (a difference) of the direction towards the position of the exhibit location, with the position of the user centered, relative to the direction of the orientation of the user in the exhibition site coordinate system.

In Step S114, a new record is generated in the sound source direction storage section 136 for each record retrieved from the exhibit location information storage section 134. The sound source ID for each retrieved record is stored in the "sound source ID" of each generated record. Also, the user ID included in the guide request is stored in the "user ID" of each record. In this stage, nothing is stored in the "direction" of each record.

Figure 11:
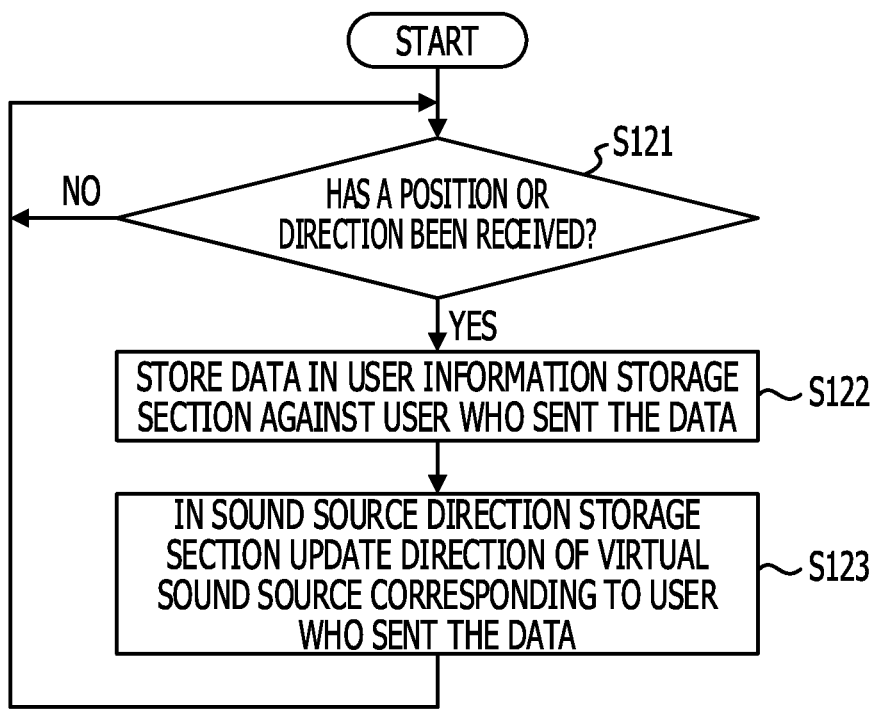
FIG. 11 is a flowchart illustrating an example of processing procedures that a position and direction management section executes.

Subsequently, processing procedures that the position and direction management section 123 executes will be subsequently described. FIG. 11 is a flowchart illustrating an example of processing procedures that a position and direction management section executes.

The position and direction management section 123 stands by to receive position information or direction information from the mobile terminal 20 (S121). When position information or direction information from any one of a plurality of mobile terminals 20 is received (S122), the position and direction management section 123 stores the position information or the direction information in the user information storage section 131 (FIG. 6) (S122). Specifically, the position information includes the X coordinate value and the Y coordinate value in the exhibition site coordinate system. The position and direction management section 123 stores the X coordinate value and the Y coordinate value respectively in the "X coordinate value" and the "Y coordinate value" of the record corresponding to the user ID received with the position information. Also, the direction information includes an angle in the horizontal direction and an angle of the vertical direction. The position and direction management section 123 additionally stores the angle in the horizontal direction at the end of the "horizontal direction history" of the record corresponding to the user ID received with the direction information. Moreover, the position and direction management section 123 additionally stores the angle in the vertical direction at the end of the "vertical direction history" of the record corresponding to the user ID received with the direction information.

Subsequently, the position and direction management section 123 updates, in the sound source direction storage section 136, the value of the "direction" of each virtual sound source in association with the user ID concerning the mobile terminal 20 serving as the sending source of the direction information (FIG. 10) (S123). That is, the value of the "direction" is updated to a difference from the direction concerning newly received direction information.

The position and direction transfer section 213 of each mobile terminal 20 transfers, to the server device 10, the position information that includes the X coordinate value and the Y coordinate value detected or measured by the location sensor 23 and the direction information that includes the angles detected or measured by the direction sensor 24, for example, on regular basis. As another alternative, transfer of the position information and the direction information may be performed when there is a change in the X coordinate value or the Y coordinate value, or the angle indicating the direction. In any case, the X coordinate value, the Y coordinate value, and the horizontal and vertical directions in the latest state of each user are stored in the user information storage section 131.

Figure 12:
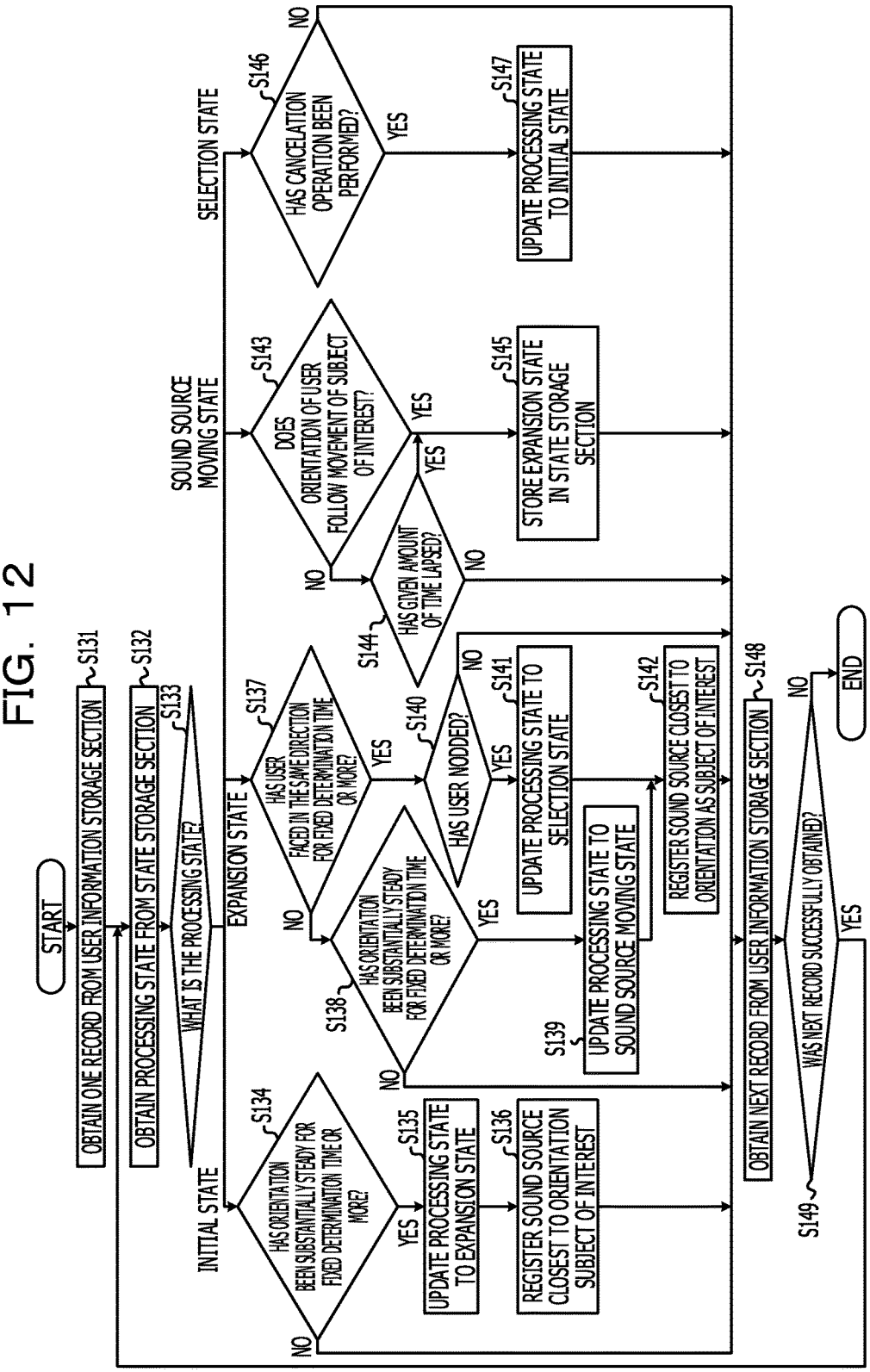
FIG. 12 is a flowchart illustrating an example of processing procedures that a state determining section executes.

Processing procedures that the state determining section 124 executes will be subsequently described. FIG. 12 is a flowchart illustrating an example of processing procedures that a state determining section executes. The processing of FIG. 12 is repeatedly executed on regular basis (for example, every several milliseconds). Alternatively, each time the position information or the direction information is received, the processing of FIG. 12 may be executed for the user ID concerning the position information or the direction information.

In Step S131, the state determining section 124 obtains a record, for example, in the order of the records of the user information storage section 131. The obtained record will be hereinafter referred to as a "target user record". Also, the user concerning the target user record will be referred to as a "target user". Subsequently, the state determining section 124 obtains a value (hereinafter referred to as a "target processing state") of a "processing state" of a record (hereinafter referred to as a "target state record") including the user ID of the target user record among the records of the state storage section 133 (S132). Then, the state determining section 124 causes the processing to branch in accordance with the target processing state (S133).

When the target processing state is an "initial state", the state determining section 124 determines whether or not the orientation of the target user has been substantially steady for a given time or more (S134). The determination is performed on the basis of the history of the angle in the horizontal direction stored in the "horizontal direction history" of the target user record. Specifically, it is determined whether or not the range of change in the angle in the history during the given time from the time when the orientation of the target user is stored last is less than or equal to a threshold. If new information is added to the horizontal direction history at a given time interval, the history during the given time may be specified on the basis of the ratio between the given time and the given time. When new history information is added to the horizontal direction history at irregular time intervals, the time when the new history information is added to the horizontal direction history may be stored for each history information. On the basis of the time, the history during the given time may be specified.

Note that the given time may be sufficient time to determine that the orientation of the user is substantially fixed. In the present embodiment, the given time is referred to as a "fixed determination time". Also, the threshold regarding the change in angle may be an angle at which the orientation of the user is substantially steady. In the present embodiment, the threshold is referred to as a "substantially steady angle".

When the orientation of the target user has not been substantially steady for the fixed determination time or more (NO in S134), the state determining section 124 obtains the next record from the user information storage section 131 (S148). That is, the processing state is not changed for the target user. However, there might be cases where, even if NO in Step S134, the orientation of the user is fixed. This is because there might be cases where the orientation of the user is fixed but the fixed determination time or more has not elapsed yet.

If there is no next record (NO in S149), the processing of FIG. 12 ends. If the next record is successfully obtained (YES in S149), Step S132 and subsequent steps are executed using the next record as the target user record.

On the other hand, if the orientation of the target user has been substantially steady for the fixed determination time or more (YES in S134), the state determining section 124 updates the value of the "processing state" of the target state record to the "expansion state" (S135). That is, the processing state for the target user shifts to the expansion state. Note that the state determining section 124 may clear the value of the "horizontal direction history" of the target user record in accordance with the shift to the expansion state. This is to enable determination of the substantially steady state of the orientation of the user during a period from the time of shift to the expansion state.

Subsequently, the state determining section 124 stores the sound source ID of the virtual sound source closest to the orientation of the target user in the "subject of interest" of the state storage section 133 (S136). The virtual sound source closest to the orientation of the target user is a virtual sound source having the minimum value of the "direction" among the sound source IDs stored in association with the user IDs in the sound source direction storage section 136. Since the value of the "direction" in the sound source direction storage section 136 is a relative value (a difference) to the last (the latest) angle of the "horizontal direction history" in the target user record, the virtual sound source having the minimum value of the "direction" is the virtual sound source closest to the orientation of the target user.

Note that, as clearly understood from the description below, for the sound source for the user in the initial state, in the sound source direction storage section 136, the angle indicating the same direction as the direction of the physical sound source is stored in the "direction".

Following Step S136, Step S148 and subsequent steps are executed.

When the processing state has shifted to the expansion state, as illustrated in FIG. 2B, each virtual sound source is expanded, with the user centered, in a direction away from one of the virtual sound sources which is the closest to the orientation of the user. Note that, if each virtual sound source is distinguishable to the user, the virtual sound source may be expanded by some other method. That is, a given interval is ensured between the directions of the virtual sound sources.

When the target processing state is the "expansion state", the state determining section 124 determines whether or not the target user has faced substantially in the same direction as the direction in the initial state for the fixed determination time or more (S137). That is, whether or not, even after the virtual sound source is expanded, the orientation of the target user is still in the same direction as that before the expansion is determined. For example, in the "horizontal direction history" of the target user record, a determination is performed on the basis of whether or not the change in angle stored during the fixed determination time after the shift to the expansion state is within the range of a substantially steady angle. Note that, as described in Step S135, the "horizontal direction history" of the target user record is cleared when the processing state shifts to the expansion state, and thus, the angle stored in the "horizontal direction history" of the target user record may be easily specified within the fixed determination time from the shift to the expansion state.

When the target user faces a different direction from the direction in the initial state (NO in S137), the state determining section 124 determines whether or not the orientation of the target user in the different direction has been substantially steady for the fixed determination time (S138). That is, as a result of the expansion of the virtual sound source that has caused each virtual sound source to be easily distinguishable, the target user moves their face from side to side to search for the sound source in which the user is interested and whether or not the orientation of the target user is finally fixed to the direction of a single sound source is determined. The same determination method as that described in Step S134 may be used.

If the orientation of the target user has not been substantially steady for the fixed determination time or more (NO in S138), Step S148 and subsequent steps are executed. However, there might be cases where, even if NO in Step S138, the orientation of the user is fixed. That is because there are cases where the orientation of the user is fixed but the fixed determination time or more has not yet elapsed.

If the orientation of the target user has been substantially steady for the fixed determination time or more (YES in S138), the state determining section 124 updates the value of the "processing state" of the target state record to the "sound source moving state" (S139). That is, the processing state concerning the target user shifts to the sound source moving state. Subsequently, the state determining section 124 stores the sound source ID of the virtual sound source closest to the orientation of the target user in the "subject of interest" of the target state record (S142). The same processing as that of Step S136 may be performed in Step S142.

Conversely, if the target user has faced substantially the same direction as the direction in the initial state for the fixed determination time or more (YES in S137), the state determining section 124 estimates that the virtual sound source whose sound source ID is stored in the "subject of interest" of the target state record is the virtual sound source in which the target user is interested. Then, in this case, the state determining section 124 determines whether or not the target user has nodded (S140). Whether or not the user has nodded is determined, for example, on the basis of the history of the angle stored in the "vertical direction history" of the target user record. For example, whether or not the user has nodded may be determined by comparing the angle during the latest given time included in the "vertical direction history" to the threshold.

If it is not determined that the target user has nodded (NO in S140), Step S148 and subsequent steps are executed. If it is determined that the target user has nodded (YES in S140), the state determining section 124 updates the value of the "processing state" of the target state record to the "selection state" (S141). That is, the processing state concerning the target user shifts to the selection state. Subsequently, Step S142 and subsequent steps are executed. As will be described later, when the processing state has shifted to the selection state, a sound other than the virtual sound source of the subject of interest is deleted. That is, when viewed from the user, only the sound of the virtual sound source of the subject of interest may be heard from the direction of the physical sound source.

If the target processing state is the "sound source moving state", the state determining section 124 determines whether or not the orientation of the target user follows the move of the virtual sound source of the subject of interest (S143). That is, whether or not the orientation of the target user has changed to the moving direction of the virtual sound source of the subject of interest is determined. As illustrated in FIG. 2C, in the sound source moving state, the virtual sound source toward which the orientation of the user is fixed moves slowly (at a given speed) in the direction of the physical sound source. As will be described later, as for the move of the virtual sound source, the value of the "direction" of each virtual sound source in the sound source direction storage section 136 is updated little by little (for example, by a given angle) such that the direction of the virtual sound source becomes closer to the direction of the physical sound source. Also, the value of the "direction" is a relative value assuming the orientation of the target user is 0 degrees. Therefore, whether or not the orientation of the target user has followed the move of the virtual sound source of the subject of interest is determined, for example, on the basis of whether or not the value of the "direction" stored in the sound source direction storage section 136 for the sound source ID stored in the "subject of interest" of the target state record is less than the given value. As another alternative, whether or not the orientation of the target user has followed the move of the virtual sound source of the subject of interest may be determined by analyzing the history of the angle indicating the orientation of the target user stored in the "horizontal direction history" of the target user record.

If it is determined that the orientation of the target user follows the move of the virtual sound source of the subject of interest (YES in S143), the state determining section 124 estimates that the target user is interested in the virtual sound source. Then, the state determining section 124 updates the value of the "processing state" of the target state record to the "expansion state" (S145). That is, the processing state concerning the target user shifts to the expansion state. In this case, other virtual sound sources are expanded, with the target user centered, in the direction away from the virtual sound source of the subject of interest, after the move is ended. Subsequently, Step S148 and subsequent steps are executed.

Conversely, if it is determined that the orientation of the target user does not follow the move of the virtual sound source of the subject of interest (NO in S143), the state determining section 124 determines whether or not a given time has elapsed since the processing state shifted to the sound source moving state (S144). The given time may be determined, for example, on the basis of the time until the user responds to the move of the virtual sound source.

If the given time has not elapsed (NO in S144), Step S148 and subsequent steps are executed. Note that, in this case, there might be cases where the user follows the move of the virtual sound source of the subject of interest. It is considered that it takes a certain amount of time for the target user to respond to the move of the virtual sound source. Therefore, in many cases, when the target user follows the move of the virtual sound source of the subject of interest, the state where the determination result in Step S143 is NO continues for a while, and then, YES in Step S143 is obtained.

If the target user still does not follow the move of the virtual sound source and the given time has elapsed (YES in S144), Step S145 and subsequent steps are executed. That is, the processing state concerning the target user shifts to the expansion state. In this case, each virtual sound source is expanded, with the target user centered, in the direction away from the orientation of the target user.

If the target processing state is the "selection state", the state determining section 124 determines whether or not the target user has performed a cancellation operation (S146). The cancellation operation is an operation performed to cancel the selection state and return the processing state to the initial state. In the present embodiment, the cancellation operation is performed by shaking the head side to side. Therefore, whether or not the user has performed the cancellation operation may be determined, for example, by analyzing the contents of the "horizontal direction history" of the target user record.

If it is determined that the target user has performed the cancellation operation (YES in S146), the state determining section 124 updates the value of the "processing state" of the target state record to the "initial state" (S147). That is, the processing state concerning the target user shifts to the initial state. Subsequently, Step S148 and subsequent steps are executed.

Conversely, if it is determined that the target user has not performed the cancellation operation (NO in S146), Step S148 and subsequent steps are executed. Therefore, for the target user, the selection state continues.

Note that, the processing of FIG. 12 may be started again from the first user immediately after the processing for all users ends. Also, a thread or process may be started for each user and the processing of FIG. 12 may be performed in parallel for each user. In this case, loop processing for each user is not performed.

Figure 13:
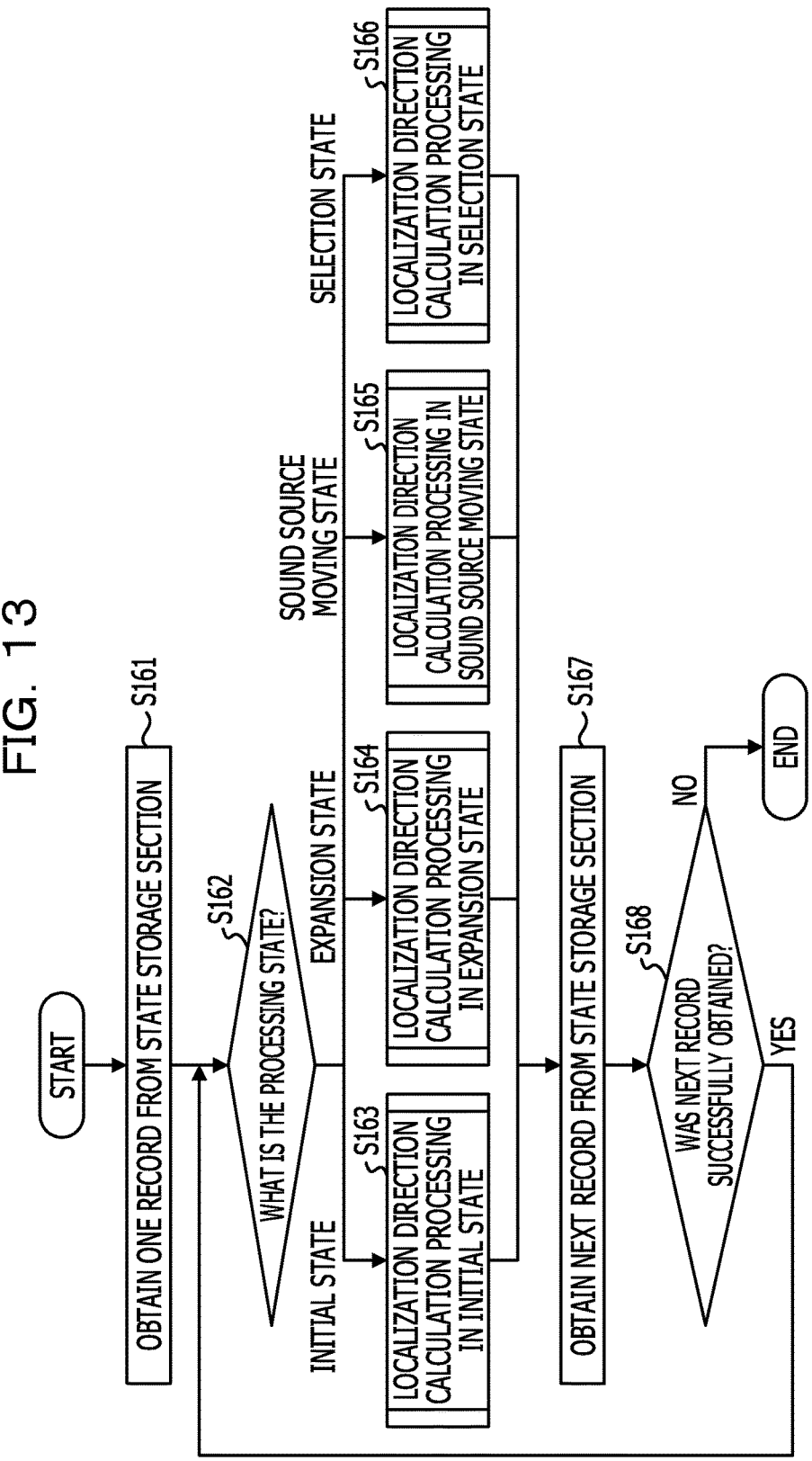
FIG. 13 is a flowchart illustrating an example of processing procedures that a localization direction calculating section executes.

Subsequently, processing procedures that the localization direction calculating section 125 executes will be hereinafter described. FIG. 13 is a flowchart illustrating an example of processing procedures that a localization direction calculating section executes. The processing of FIG. 13 is repeatedly executed on regular basis (for example, every several milliseconds).

In Step S161, the localization direction calculating section 125 obtains a single record, for example, in the order of records stored in the state storage section 133. The record will be hereinafter referred to as a "target state record". Subsequently, the localization direction calculating section 125 causes the processing to branch in accordance with the value (which will be hereinafter referred to as a "target processing state") of the "processing state" of the target state record (S162). That is, the localization direction calculating section 125 executes localization direction calculation processing in accordance with the target processing state (S163 to S166).

Subsequently, the localization direction calculating section 125 obtains the next record from the state storage section 133 (S167). If there is no next record (NO in S168), the processing of FIG. 12 is ended. If the next record is successfully obtained (YES in S168), Step S162 and the subsequent steps are executed with the next record serving as the target state record.

Note that the processing of FIG. 13 may be started again from the first record immediately after processing of all of the records is ended. Also, a thread or process may be started for each record, and processing may be executed in parallel for each record. In this case, loop processing for each record is not performed.

Figure 14:
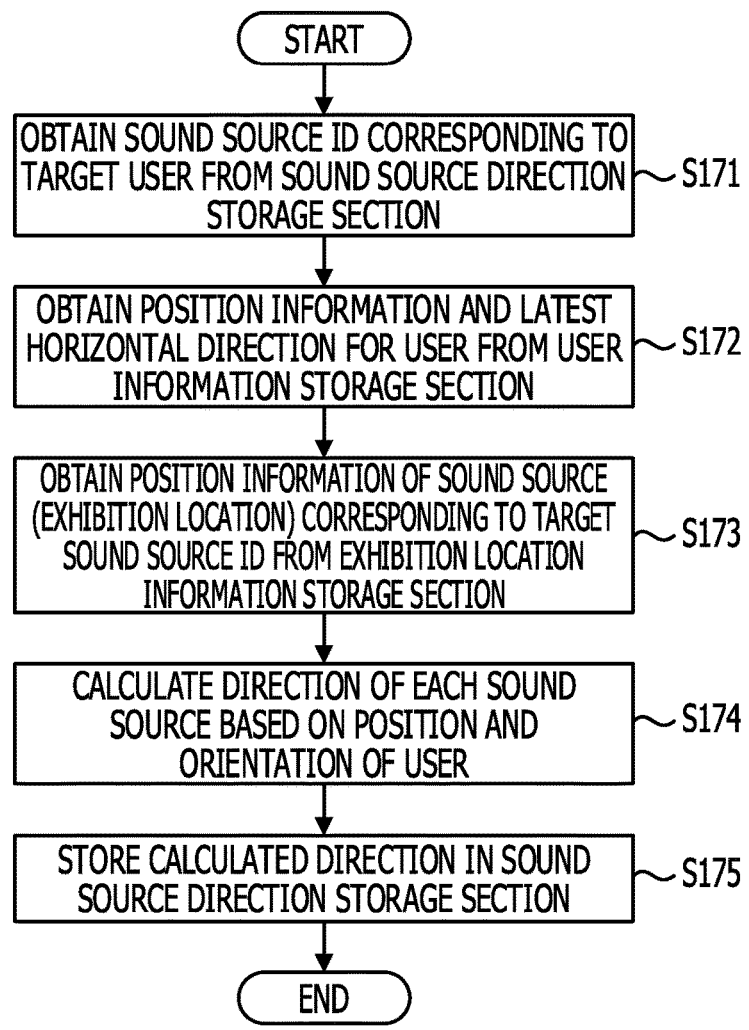
FIG. 14 is a flowchart illustrating an example of processing procedures for localization direction calculation processing in an initial state.

Subsequently, details of Step S163 will be described. FIG. 14 is a flowchart illustrating an example of processing procedures of localization direction calculation processing in an initial state.

In Step S171, the localization direction calculating section 125 obtains one or more sound source IDs that are associated with the user ID (which will be hereinafter referred to as a "target user ID") of the target state record from the sound source direction storage section 136. The obtained sound source ID will be hereinafter referred to as a "target sound source ID". Subsequently, the localization direction calculating section 125 obtains, from the user information storage section 131 (FIG. 6), each of the "X coordinate value", the "Y coordinate value", and the "horizontal direction history" that are associated with the target user ID (S172). It is allowed to obtain just the latest (the last) value for the value of the "horizontal direction history". The latest value will be hereinafter merely referred to as a "horizontal direction".

Subsequently, the localization direction calculating section 125 obtains, from the exhibit location information storage section 134 (FIG. 9), the "X coordinate value" and the "Y coordinate value" associated with the sound source ID corresponding to the target sound source ID (S173).

Subsequently, the localization direction calculating section 125 calculates an angle indicating the relative direction of the virtual sound source (which will be hereinafter referred to as a "target virtual sound source") for each target sound source ID on the basis of the current position and orientation of the user (which will be hereinafter referred to as a "target user") for the target user ID (S174). The position of the target user is specified by the values of the "X coordinate value" and the "Y coordinate value" obtained in Step S172. The orientation of the target user is specified by the horizontal direction obtained in Step S172. On the basis of these values, the direction of the position specified by the "X coordinate value" and the Y coordinate value" for each target sound source ID, which have been obtained in Step S173, is calculated.

Subsequently, the localization direction calculating section 125 stores each calculated angle in the "direction" of the record corresponding to each target sound source ID in the sound source direction storage section 136 (S175). Note that, as will be described later, the sound image localization section 126 performs sound image localization processing on the basis of the "direction" that the sound source direction storage section 136 stores. Thus, sound image localization processing is performed such that each target user hears each target virtual sound source from the corresponding physical sound source (exhibit location) in an initial state.

Figure 15:
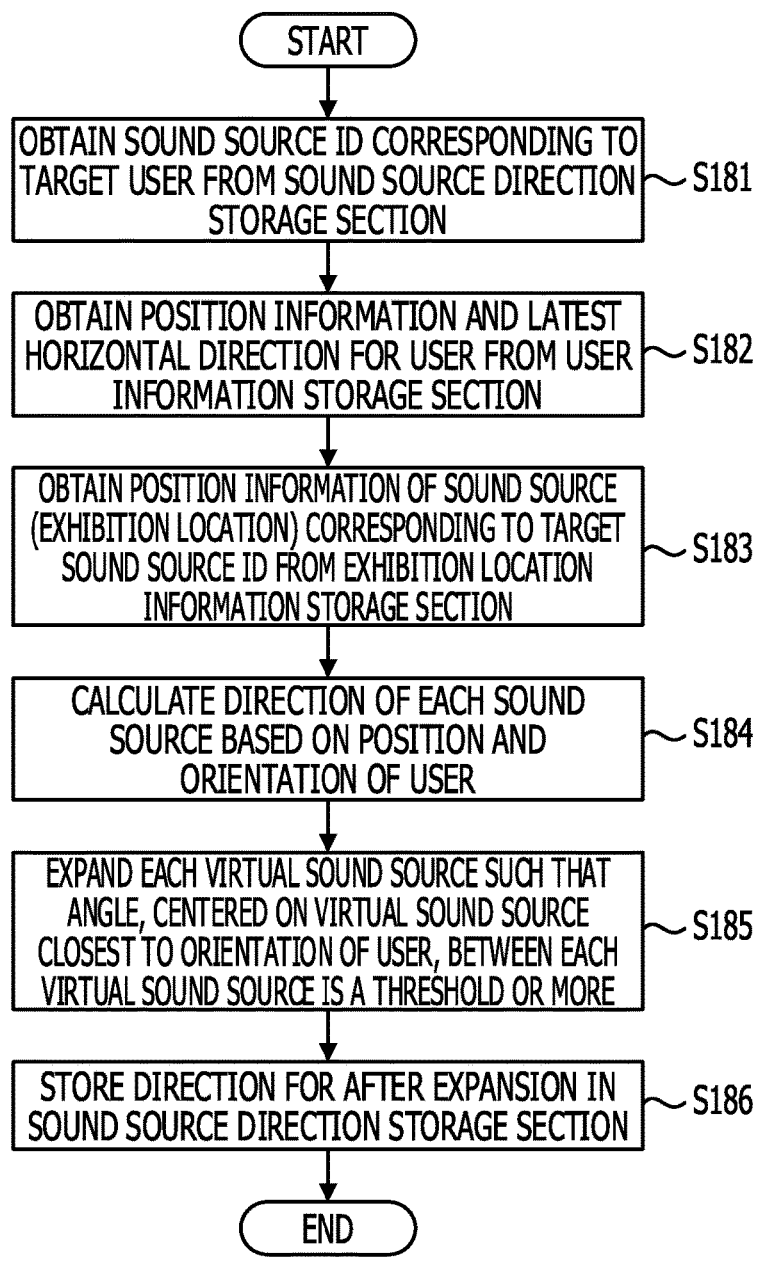
FIG. 15 is a flowchart illustrating an example of processing procedures for localization direction calculation processing in an expansion state.

Subsequently, details of Step S164 of FIG. 13 will be described. FIG. 15 is a flowchart illustrating an example of processing procedures of localization direction calculation processing in an expansion state.

Steps S181 to S184 are the same as Steps S171 to S174 of FIG. 14. In Step S185, the localization direction calculating section 125 calculates, for each target virtual sound source, a direction after the direction of each virtual sound source is expanded in the direction away from the target virtual sound source closest to the orientation of the target user. For the threshold of the angle between target virtual sound sources, for example, a value stored in the acoustic resolution characteristic storage section 135 is used.

FIG. 16 is a table illustrating an example configuration of an acoustic resolution characteristic storage section. In FIG. 16, in the acoustic resolution characteristic storage section 135, the threshold of the angle between virtual sound sources is stored in accordance with the relative direction to the orientation of the user. On the basis of an example illustrated in FIG. 16, in Step S184, an interval between virtual sound sources in the direction within the range of 0 degree to plus or minus 30 degrees is expanded to 40 degrees or more. An interval between virtual sound sources in the direction within the range of over 30 degrees to 60 degrees is expanded to 20 degrees or more. An interval between virtual sound sources in the direction within the range of over 60 degrees to 90 degrees is expanded to 15 degrees or more. The reason why the threshold in the front direction is smaller than the lateral direction when viewed from the user is that the human acoustic resolution is higher in the lateral direction than in the front direction. However, regardless of the direction, a particular value (for example, 30 degrees, and so forth) may be used as the threshold across the board.

Note that, in order to avoid confusing the user, expansion of each virtual sound source may be slowly performed. In this case, the expansion width by which the virtual sound source is expanded while Step S185 is executed once may be set to be a value obtained by dividing the threshold, in consideration of the cycle at which the processing of the FIG. 15 is repeated. However, the expansion width in Step S185 is an accumulated value of the value obtained by dividing the threshold. If the expansion width is the same every time, the user does not feel that the virtual sound source is expanded. Therefore, the localization direction calculating section 125 stores the accumulated value of the expansion width from the start of the expansion to the end of expansion in the memory device 103 and, when Step S185 is executed, the virtual sound source may be expanded by a value obtained by adding the expansion width, by which the virtual sound source is expanded by executing Step S185 once, to the accumulated value stored in the memory device 103. Note that the expansion is completed, for example, when the accumulated value of the expansion width reaches the threshold. In other words, when the accumulated value reaches the threshold, addition of the expansion width to the accumulated value is not performed.

Subsequently, the localization direction calculating section 125 stores in the sound source direction storage section 136 an angle indicating the direction of each target virtual sound source after calculation for the "direction" of the record corresponding to each target sound source ID (S186). Note that, for a virtual sound source whose direction after update is out of the range (which will be hereinafter referred to as a "localization target range") of, for example, plus or minus 90 degrees with reference to the orientation of the target user, the value of the "direction" may be deleted. In this case, the virtual sound source is not a target of sound image localization processing. Therefore, the target user does not hear the sound from the virtual sound source. This is to avoid a case where, as a result of expansion of the virtual sound source from the side to side on the basis of the orientation of the target user, the virtual sound sources concentrate behind of the user and thus it is difficult to hear the sound from other virtual sound sources. The value of the localization target range may be some degrees other than plus or minus 90 degrees. However, instead of completely deleting the sound of a virtual sound source out of the localization target range, the volume of the sound may be turned down.

Figure 17:
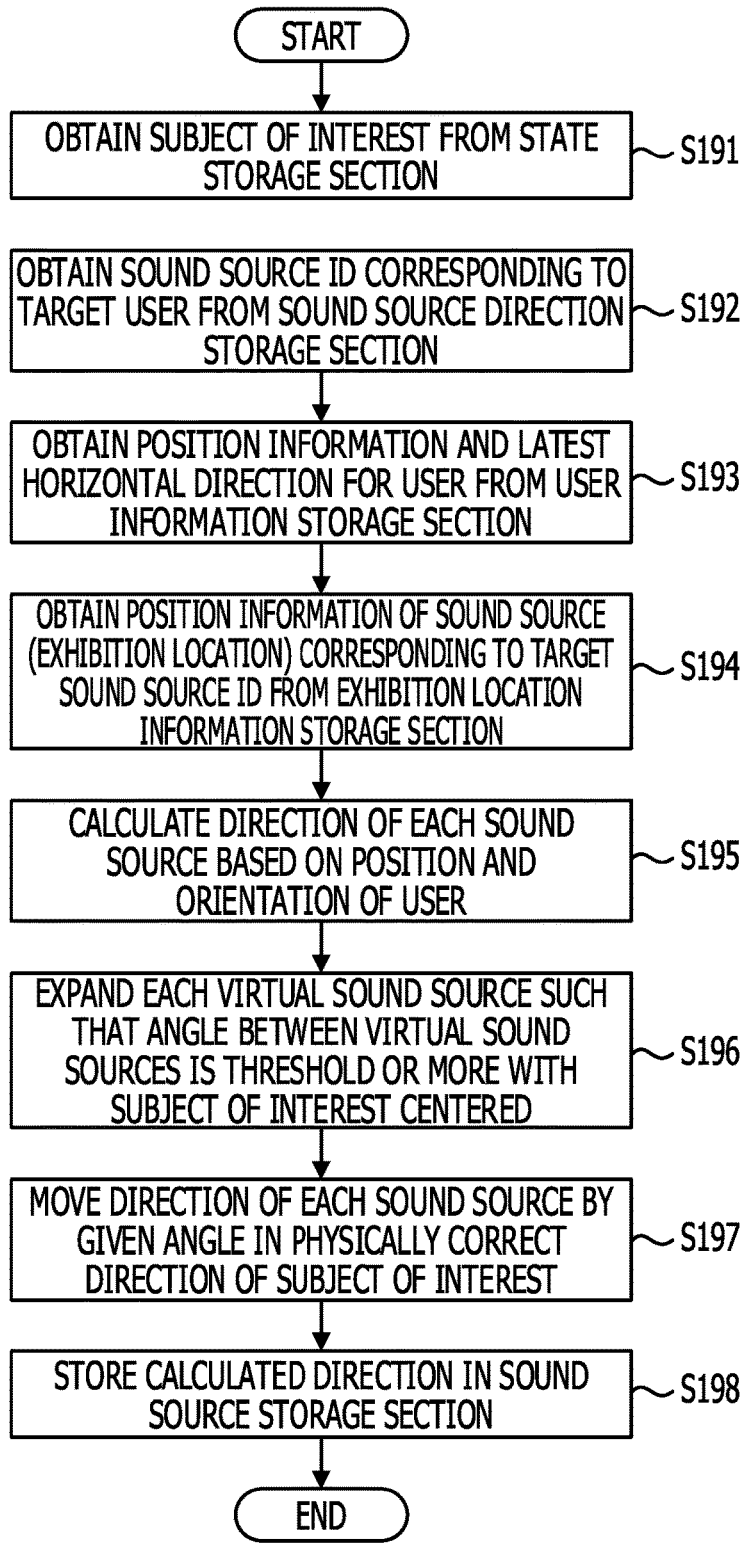
FIG. 17 is a flowchart illustrating an example of processing procedures for localization direction calculation processing in a sound source moving state.

Subsequently, details of Step S165 of FIG. 13 will be described. FIG. 17 is a flowchart illustrating an example of processing procedures of localization direction calculation processing in a sound source moving state.

In Step S191, the localization direction calculating section 125 obtains, from the state storage section 133, the value (sound source ID) of the "subject of interest" associated with the target user ID. The virtual sound source concerning the obtained sound source ID will be hereinafter referred to as an "subject of interest virtual sound source". Subsequent Steps S192 to S195 are the same as Steps S171 to S174 of FIG. 14. That is, the position information and horizontal direction of the target user and the position information of the physical sound source corresponding to the target virtual sound source are obtained, and the direction of each target virtual sound source is calculated.

Subsequently, the localization direction calculating section 125 calculates, for each target virtual sound source, a direction after the direction of each target virtual sound source is expanded, in the direction away from the target virtual sound source closest to the orientation of the target user, such that an angle between the directions of adjacent target virtual sound sources is a threshold or more (S196). Processing of Step S196 may be the same as that of S185 of FIG. 15. However, in Step S196, the threshold is reached by performing expansion once, and then, the expansion is completed. This is because that Step S196 is not the processing of causing the user to feel that each virtual sound source is slowly expanded but the processing of maintaining an interval between virtual sound sources after expansion has already ended.

Subsequently, the localization direction calculating section 125 calculates, for each target virtual sound source, a direction after the direction of each target virtual sound source is moved by a given angle from the subject of interest virtual sound source in the direction of the physical sound source corresponding to a monitor target virtual sound source (S197). In consideration of the cycle at which the processing of FIG. 17 is repeated, the given angle may be an angle at which the user feels that the target virtual sound source slowly moves.

Subsequently, the localization direction calculating section 125 stores in the sound source direction storage section 136 an angle indicating the direction of each target virtual sound source after calculation (moving) in the "direction" of the record corresponding to each target sound source ID (S198). Note that, for the virtual sound source whose direction after moving is out of the localization target range, the value of the "direction" may be deleted.

Figure 18:
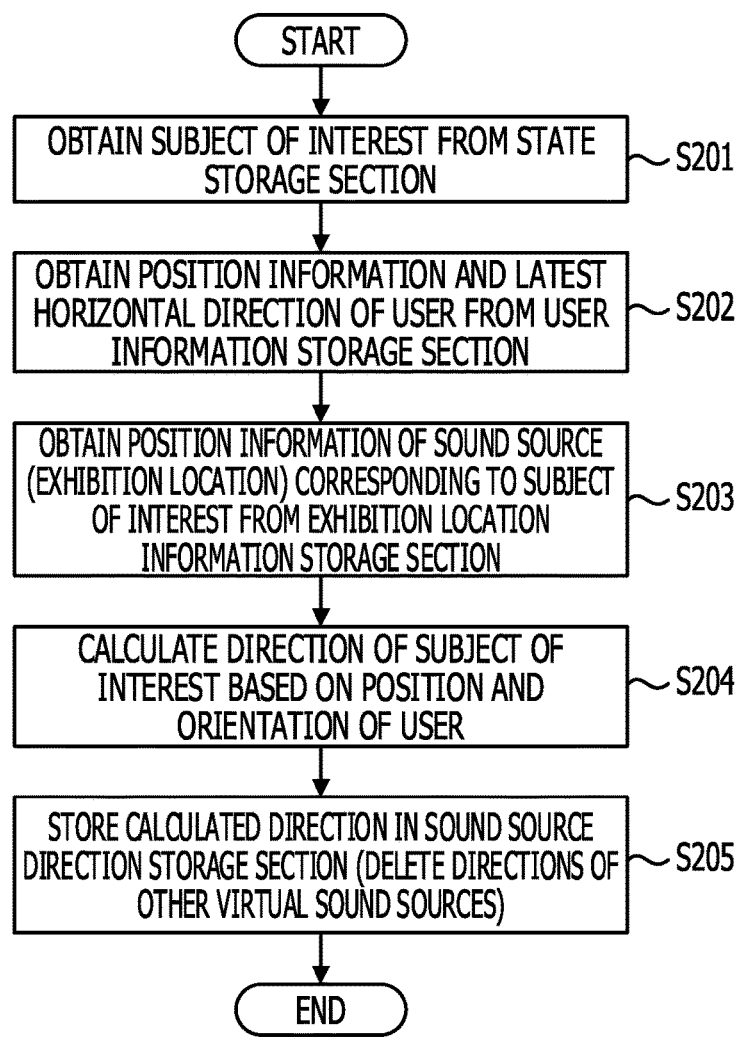
FIG. 18 is a flowchart illustrating an example of processing procedures for localization direction calculation processing in a selection state.

Subsequently, details of Step S166 of FIG. 13 will be described. FIG. 18 is a flowchart illustrating an example of processing procedures of localization direction calculation processing in a selection state.

In Step S201, the localization direction calculating section 125 obtains, from the state storage section 133, the value (sound source ID) of the "subject of interest" in association with the target user ID. The virtual sound source concerning the obtained sound source ID will be hereinafter referred to as a "subject of interest virtual sound source". Step S202 is the same as Step S172 of FIG. 14.

Subsequently, the localization direction calculating section 125 obtains, from the exhibit location information storage section 134 (FIG. 9), the values of the "X coordinate value" and the "Y coordinate value" associated with the sound source ID corresponding to the sound source ID of the subject of interest virtual sound source (S203).

Subsequently, the localization direction calculating section 125 calculates the relative direction of the subject of interest virtual sound source based on the current position and orientation of the target user (S204). Subsequently, the localization direction calculating section 125 stores the calculated direction in the "direction" of the record corresponding to the sound source ID of the subject of interest virtual sound source in the sound source direction storage section 136 (S205). Note that the "direction" of a target virtual sound source other than the subject of interest virtual sound source may be deleted. As a result, in the selection state, the user hears only the sound of the subject of interest virtual sound source from the direction of the physical sound source (exhibit location). However, the volume of the sound from a target virtual sound source other than the subject of interest virtual sound source may just be turned down. Basically, for the user, the sound from the subject of interest virtual sound source may be caused to be easier to hear than the sounds from the other target virtual sound sources. Also, in the selection state, if each target virtual sound source continues to be in an expansion state, the volume of the sound from a target virtual sound source other than the subject of interest virtual sound source may possibly not be turned down or turned off. This is because, in this case, it is considered that the user may easily distinguish the monitor target virtual sound source from other virtual sound sources.

Figure 19:
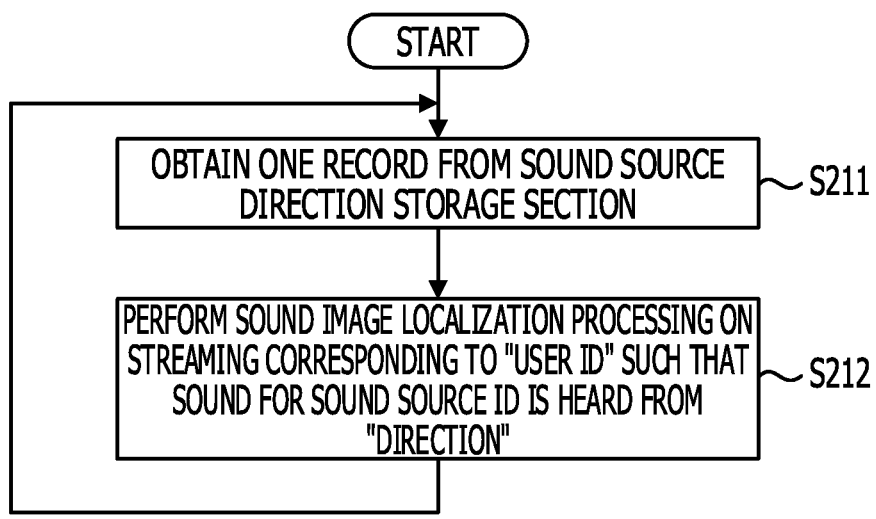
FIG. 19 is a flowchart illustrating an example of processing procedures that a sound image localization section executes.

Subsequently, processing procedures that the sound image localization section 126 executes will be described. FIG. 19 is a flowchart illustrating an example of processing procedures that a sound image localization section executes.

In Step S211, the sound image localization section 126 obtains a single record, for example, in the order of records stored in the sound source direction storage section 136 (FIG. 10). The stored record will be hereinafter referred to as a "target record". Subsequently, the sound image localization section 126 executes sound image localization processing for streaming corresponding to the user ID stored in the "user ID" of the target record (S212). In the sound image localization processing, sound image localization is performed so that the sound from the exhibition microphone 21 corresponding to the "sound source ID" of the target record is heard from the angle indicated by the "direction" of the target record. Note that sound image localization may be realized using the related art technology.

The processing procedures described above will be described with reference to a specific example. Note that, in each specific example, a case where the user ID of the target user is "AAA" will be described.

Figure 20E:
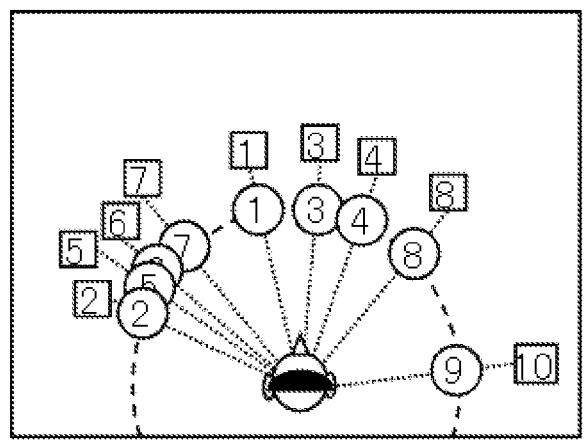

FIG. 20A, FIG. 20B, FIG. 20C, FIG. 20D, FIG. 20E, and FIG. 20F are diagrams illustrating an example initial state. In FIG. 20A, the record concerning the target user (hereinafter referred to as a "state record") is indicated in the state storage section 133. In FIG. 20B, the record concerning the target user (hereinafter referred to as a "user record") is indicated in the user information storage section 131. Also, in FIG. 20C, the record concerning the target user (hereinafter referred to as an "exhibit location record") is indicated in the exhibit location information storage section 134. Note that, in the specific example of each record, items that are not to be used to describe the processing procedures are omitted for convenience sake. Also, the "horizontal direction" of the user record in FIG. 20B represents the last (most recent) history of the "horizontal direction history".

In the state record indicated in FIG. 20A, the value of the "processing state" is the "initial state", and thus, the localization direction calculating section 125 executes the processing illustrated in FIG. 14 based on the user record indicated in FIG. 20B and the exhibit location record indicated in the FIG. 20C. As a result, in the sound source direction storage section 136, the stored contents of the record concerning the target user (which will be hereinafter referred to as a "sound source direction record") is as indicated in FIG. 20D. Note that, in FIG. 20A, FIG. 20B, FIG. 20C, FIG. 20D, FIG. 20E, and FIG. 20F, the orientation of the user is 0 degrees.

On the basis of the sound source direction record illustrated in FIG. 20D, the sound image localization section 126 performs sound image localization processing. As a result, the target user hears the sound of each virtual sound source from the corresponding direction indicated in FIG. 20E. That is, in the initial state, the direction of each virtual sound source matches the direction of the corresponding physical sound source. How to view FIG. 20E is the same as how FIG. 2A, FIG. 2B, FIG. 2C, and FIG. 2D are viewed.

Figure 20F:
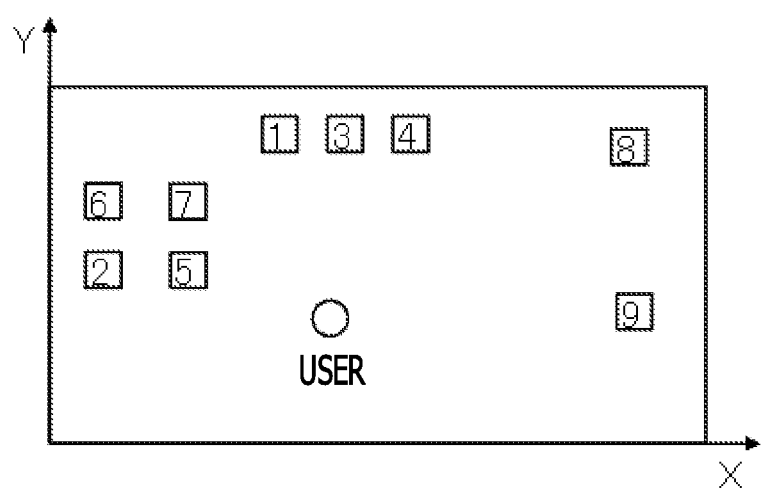

In FIG. 20F, the position of the user in the exhibition site coordinate system and the position of each physical sound source (each exhibit location) are indicated for reference.

In the initial state, when the orientation of the user has been fixed to a substantially steady direction for the fixed determination time, the processing state shifts to the expansion state.

Next, FIG. 21A, FIG. 21B, FIG. 21C, FIG. 21D, and FIG. 21E are a first group of diagrams illustrating an example expansion state. In FIG. 21A, FIG. 21B, FIG. 21C, FIG. 21D, and FIG. 21E and subsequent drawings, the meaning of each of A, B, C, E, and E is the same as the meaning of the corresponding one of A, B, C, and D of FIG. 20A, FIG. 20B, FIG. 20C, FIG. 20D, and FIG. 20E. A drawing corresponding to FIG. 20F is omitted. Since the position of each exhibit location does not move, in the corresponding drawings to FIG. 20E, there is no change in the exhibit location record from that of FIG. 20E.

Figure 21E:
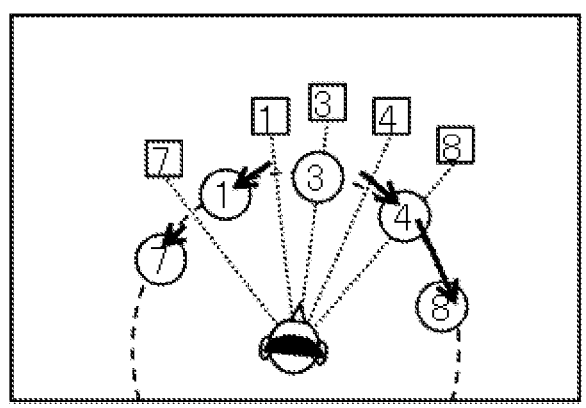

In FIG. 21A, FIG. 21B, FIG. 21C, FIG. 21D, and FIG. 21E, the value of the "processing state" of the state record of FIG. 21A is updated to the "expansion state". Also, the "horizontal direction" of the user record of FIG. 21B is updated to 10 degrees. That is, in FIG. 21A, FIG. 21B, FIG. 21C, FIG. 21D, and FIG. 21E, an example where the orientation of the target user is fixed to the direction of the virtual sound source 3, which is in the direction of 10 degrees, and the processing state is caused to shift to the expansion state is illustrated. While the processing state is the expansion state, the localization direction calculating section 125 executes the processing illustrated in FIG. 15 on the basis of the user record indicated in FIG. 21B and the exhibit location record indicated in FIG. 21C. That is, other virtual sound sources are expanded, with the target user centered, in the direction away from the virtual sound source 3. As a result, the sound source direction record is as indicated in FIG. 21D.

In FIG. 21D, the value of the "direction" is described in the form of "A–B". A represents the value indicating the direction of the virtual sound source after expansion in the exhibition site coordinate system. B represents the direction of the target user. That is, the "direction" of the sound source direction record is an angle relative to the direction of the target user, and thus, is a value obtained by deducting the direction of the target user from the value of the direction after expansion. For example, the "direction" of the virtual sound source 3 in which the user faces is "10−10=0".

A virtual sound source for which no value is stored in the "direction" of the sound source direction record is a virtual sound source caused to be out of the localization target range by expansion.

On the basis of the sound source direction record indicated in FIG. 21D, the sound image localization section 126 performs sound image localization processing. As a result, the target user hears the sound of each virtual sound source from the corresponding direction indicated in FIG. 21E. Due to expansion, adjacent virtual sound sources are spaced from each other by an interval of a given angle or more. As a result, the directions of virtual sound sources other than the virtual sound source 3 are different from the directions of the corresponding physical sound sources. However, it is caused to be easier for the target user to distinguish one virtual sound source from another. It is also caused to be easier for the state determining section 124 to distinguish the sound source in which the target user is interested.

Also, the sound of the virtual sound source for which no value is stored in the "direction" of the sound source direction record is not played back. In FIG. 21A, FIG. 21B, FIG. 21C, FIG. 21D, and FIG. 21E, an example where the virtual sound sources 2, 5 and 6 are no longer played back is illustrated. However, a virtual sound source out of the localization target range may be played back. In this case, for the virtual sound source out of the localization target range, a calculation result for Step S185 of FIG. 15 may be stored in the "direction" of the sound source direction record. Alternatively, the volume of the virtual sound source out of the localization target range may be turned down.

Note that, when the target user nods after the state where the orientation of the target user is fixed to the direction of the virtual sound source 3 has continued for the fixed determination time or more, the processing state shifts to the selection state.

FIG. 22A, FIG. 22B, FIG. 22C, FIG. 22D, and FIG. 22E are a second group of diagrams illustrating an example expansion state. In FIG. 22A, FIG. 22B, FIG. 22C, FIG. 22D, and FIG. 22E, as indicated in the "horizontal direction" of the user record in FIG. 22B, the orientation of the user is changed to the direction of the virtual sound source 4, that is, 50 degrees. As indicated in FIG. 20E, the virtual sound sources 1, 3, 4, and 8 were initially in the same direction viewed from the user. Although the user is interested in the virtual sound source 4, the user did not distinguish the direction thereof and faced the direction of the virtual sound source 3. Thereafter, the virtual sound source is expanded, the sound from each virtual sound source is easily distinguishable, and thus, the user may distinguish the direction of the virtual sound source 4.

Figure 22E:
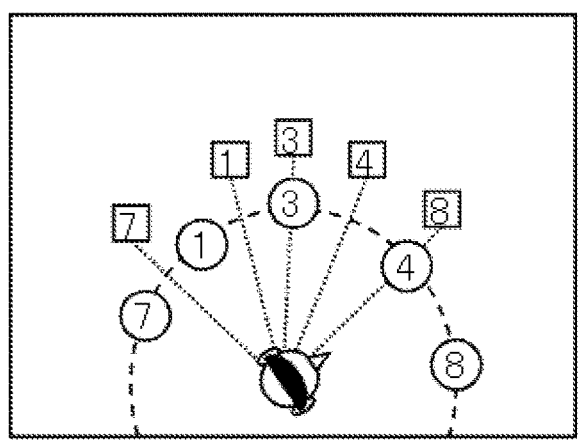

Similar to FIG. 21A, FIG. 21B, FIG. 21C, FIG. 21D, and FIG. 21E, the processing illustrated in FIG. 15 is executed for the case illustrated in FIG. 22A, FIG. 22B, FIG. 22C, FIG. 22D, and FIG. 22E. That is, the localization direction calculating section 125 executes, on the basis of the user record indicated in FIG. 22B and the exhibit location record indicated in FIG. 22C, the processing illustrated in FIG. 15. As a result, the sound source direction record is as illustrated in FIG. 22D.

Note that, technically, the processing of FIG. 15 is executed, thereby expanding each virtual sound source, with the target user centered, in the direction away from the virtual sound source 4. However, in the sound source direction record of FIG. 22D, expansion from the virtual sound source 4 is not taken into consideration for convenience sake. Therefore, the direction of each virtual sound source in FIG. 22E is the same as that of FIG. 21E.

When the orientation of the target user has been fixed in the direction of the virtual sound source 4 for the fixed determination time or more, the processing state shifts to the sound source moving state. This is to determine in which one of the virtual sound source 4, the exhibit location for the physical sound source 8, and something that the user sees beyond the virtual sound source 4 or the exhibit location for the physical sound source 8 the target user is interested.

Figure 23E:
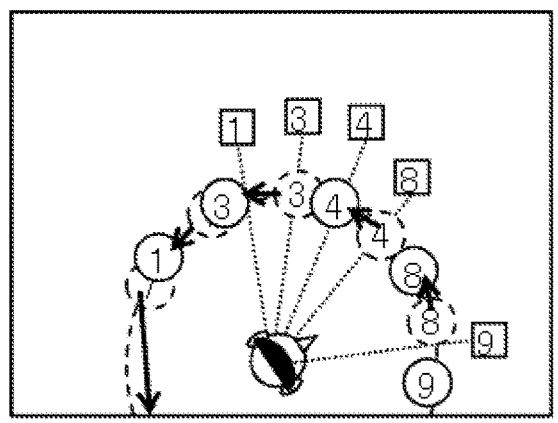

FIG. 23A, FIG. 23B, FIG. 23C, FIG. 23D, and FIG. 23E are a first group of diagrams illustrating an example sound source moving state. In FIG. 23A, FIG. 23B, FIG. 23C, FIG. 23D, and FIG. 23E, the value of the "processing state" of the state record of FIG. 23A is updated to the "sound source moving state". Therefore, the localization direction calculating section 125 executes the processing illustrated in FIG. 17 on the basis of the user record indicated in FIG. 23B and the exhibit location record indicated in FIG. 23C. As a result, the sound source direction record is as indicated in FIG. 23D. That is, the direction of each virtual sound source moves from the virtual sound source 4 to the physical sound source 4, and the value of the "direction" of the sound source direction record is updated by an amount corresponding to the move.

The sound image localization section 126 performs sound image localization processing on the basis of the sound source direction record indicated in FIG. 23D. Processing by the localization direction calculating section 125 and processing by the sound image localization section 126 are repeated, and thereby, as illustrated in FIG. 23E, each virtual sound source slowly moves from the virtual sound source 4 to the physical sound source 4 when viewed from the user. Note that the virtual sound source which has become within the localization target range by the move is again played back. Conversely, a virtual sound source which has become out of the localization target range by the move is not played back.

Figure 24E:
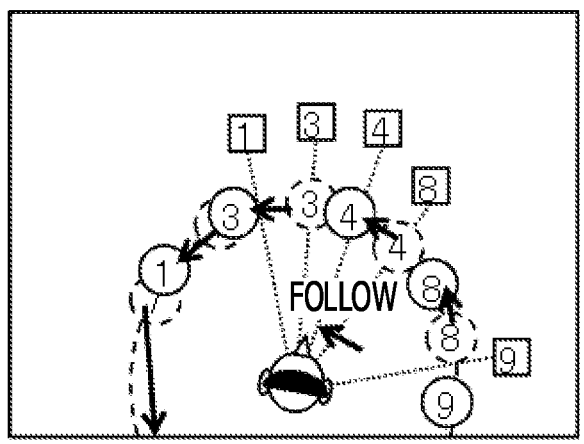

FIG. 24A, FIG. 24B, FIG. 24C, FIG. 24D, and FIG. 24E are a second group of diagrams illustrating an example sound source moving state. In FIG. 24A, FIG. 24B, FIG. 24C, FIG. 24D, and FIG. 24E, an example where the orientation of the target user follows the move of the virtual sound source 4 is illustrated. That is, the value of the "horizontal direction" of the user record in FIG. 24B is updated to "30". As a result, in the sound source direction record in FIG. 24D, the value of the "direction" of the virtual sound source 4 which has moved to the direction of the physical sound source 4 is 30–30=0 degrees. That is, the value of 0 degrees indicates that the target user faces in the direction of the virtual sound source 4 after the move.

FIG. 25A, FIG. 25B, FIG. 25C, FIG. 25D, and FIG. 25E are a first group of diagrams illustrating an example of the shift from the sound source moving state to the expansion state. In FIG. 25A, FIG. 25B, FIG. 25C, FIG. 25D, and FIG. 25E, as illustrated in FIG. 24A, FIG. 24B, FIG. 24C, FIG. 24D, and FIG. 24E, a case where the target user follows the move of the virtual sound source 4, and then the orientation of the target user has been a substantially steady direction for the fixed determination time or more is illustrated.

In this case, the value of the "processing state" of the state record of FIG. 25A is updated to the "expansion state". Therefore, the localization direction calculating section 125 executes the processing illustrated in FIG. 15 on the basis of the user record indicated in FIG. 25B and the exhibit location record indicated in FIG. 25C. As a result, other virtual sound sources are expanded either left or right in a direction away from the virtual sound source 4 with the target user centered.

Figure 25E:
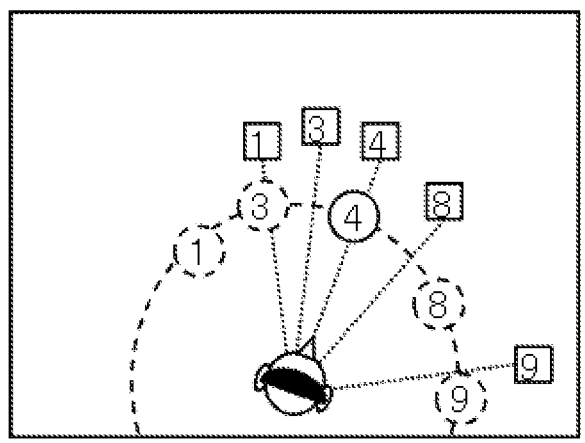

Furthermore, when the target user nods, the localization direction calculating section 125 executes the processing illustrated in FIG. 18 on the basis of the user record indicated in FIG. 25B and the exhibit location record indicated in FIG. 25C. As a result, the sound source direction record is as indicated in FIG. 25D. In FIG. 25D, the value of the "direction" corresponding to a virtual sound source other than the virtual sound source 4 has been deleted. Therefore, when sound image localization processing is executed by the sound image localization section 126 on the basis of the sound source direction indicated in FIG. 25D, as indicated in FIG. 25E, the target user hears the virtual sound source 4 from the direction of the physical sound source 4. Virtual sound sources other than the virtual sound source 4 are represented by a dashed line in FIG. 25E. The dashed line represents that the sound is a virtual sound source which is not to be played back.

FIG. 26A, FIG. 26B, FIG. 26C, FIG. 26D, and FIG. 26E are a second group of diagrams illustrating an example of the shift from the sound source moving state to the expansion state. FIG. 26A, FIG. 26B, FIG. 26C, FIG. 26D, and FIG. 26E illustrate an example where, in the sound source moving state illustrated in FIG. 23A, FIG. 23B, FIG. 23C, FIG. 23D, and FIG. 23E, the orientation of the target user does not follow the move of the virtual sound source 4 but is fixed to the direction of the physical sound source 8.

When the state where the orientation of the target user is fixed to the direction of the physical sound source 8 has continued for the fixed determination time or more, the value of the "processing state" of the state record indicated in FIG. 26A is updated to the "expansion state". Therefore, the localization direction calculating section 125 executes the processing illustrated in FIG. 15 on the basis of the user record indicated in FIG. 26B and the exhibit location record indicated in FIG. 26C. As a result, other virtual sound sources are expanded, with the target user centered, in a direction away from the virtual sound source 8.

Figure 26E:
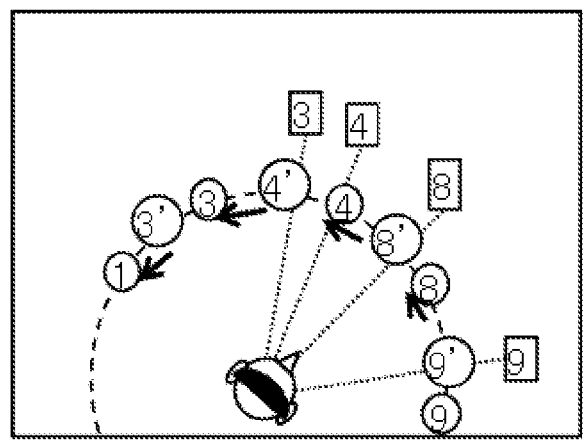

The sound image localization section 126 performs sound image localization processing on the basis of the sound source direction record indicated in FIG. 26D. As a result, the direction of each virtual sound source is as indicated in FIG. 26E. Note that, in FIG. 26E, the virtual sound sources 1, 3, 4, 8, and 9 enclosed by small circles indicate the directions of the virtual sound sources in the states indicated in FIG. 23A, FIG. 23B, FIG. 23C, FIG. 23D, and FIG. 23E. The virtual sound sources 3', 4', 8', and 9' enclosed by large circles indicate the directions of the virtual sound sources after expansion on the basis of the virtual sound source 8' is performed.

As described above, according to the present embodiment, a virtual sound source in which a user is interested may be estimated. Also, whether an interest of a user may be specified by a given movement (for example, by nodding) or an operation performed by the user. As a result, the user may be guided to the direction of the physical sound source corresponding to the virtual sound source.

Also, according to the present embodiment, it is designed that the number of manual operations performed by the user is minimized. Accordingly, for example, even when the user holds baggage in both hands, a virtual sound source in which the user is interested may be estimated and specified.

Also, the current sound from each exhibit location is provided to the user. Accordingly, the user may be guided to the exhibit location in which the user is interested according to the current situation for the user.

Note that, the present embodiment illustrates an example where in the expansion state each virtual sound source is expanded, in the direction away from the closest virtual sound source to the direction in which the user faces. However, since it is a first object to make it easier to distinguish each virtual sound source, there may be also cases where the expansion state is not performed on the basis of the closest virtual sound source to the direction in which the user faces. If an interval of a given angle or more is ensured between the directions of adjacent virtual sound sources, the closest virtual sound source may be moved to the direction in which the user faces. However, it is highly likely that the user is interested in the closest virtual sound source to the direction in which the user faces. Therefore, each virtual sound source is expanded in the direction away from the virtual sound source, and thus, in a situation after expansion, the burden on the user to search for the direction of the virtual sound source in which the user is interested may be reduced.

Also, in the sound source moving state, there may be cases where not all virtual sound sources move. For example, only the virtual sound source in which the user is interested may be a moving target. It is because, even in this case, it is possible to determine which virtual sound source the user follows. However, as described in the present embodiment, the occurrence of a case where the virtual sound source in which the user is interested overlaps another virtual sound source and thus the sound from the virtual sound source in which the user is interested is hard to hear may be avoided.

Also, according to the present embodiment, the function of the server device 10 may be mounted on each mobile terminal 20. In this case, the server device 10 is not provided.

The present embodiment may be applied to an environment other than an exhibition site, if the other environment is an environment where sounds are generated from a plurality of sound sources and a listener moves or performs some other movement with respect to one of the plurality of sound sources as a target.

Note that, in the present embodiment, the server device 10 or the mobile terminal 20 is an example of the estimation device. The localization direction calculating section 125 is an example of the specifying section and the calculation section. The state determining section 124 is an example of the estimation section.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory computer-readable recording medium storing an estimation program for causing a computer to execute a process, the process comprising:
   obtaining plural pieces of sound data originated from a plurality of sound sources, each of the plural pieces of sound data being associated with a first location of each of the plurality of sound resources;
   executing first sound image localization processing that generates first localization sound data with which each of the plurality of sound sources is able to be heard by a listener from the first location with respect to each of the plural pieces of sound data;
   executing second sound image localization processing that generates second localization sound data with which each of the plurality of sound sources is able to be heard by the listener as expanding an angle formed by two directions adjacent to each other among directions with respect to each of the plurality of sound sources included in the first localization sound data;
   outputting the second localization sound data to a terminal of the listener to cause the terminal to play back the second localization sound data;
   sensing an orientation of the listener during a playback of the second localization sound data; and
   specifying, on the basis of the change in orientation of the listener, at least one of the plurality of sound sources in which the listener is interested.

2. The non-transitory computer-readable recording medium according to claim 1, the process further comprising:
   obtaining, after the execution of the second sound image localization processing, first direction information indicating a first orientation of the listener; and
   specifying a sound source existing in a direction indicated by the first direction information among the plurality of sound sources.

3. The non-transitory computer-readable recording medium according to claim 2, the process further comprising:
   obtaining, prior to the execution of the second sound image localization processing, position information indicating a position of the listener; and
   specifying, on the basis of the position information, a second orientation from the listener for each of the plurality of sound sources,
   wherein the executing of the second sound image localization processing generates the second localization sound data including a sound apparently output from a third orientation that is different from the second orientation for at least one of the pieces of sound data.

4. The non-transitory computer-readable recording medium according to claim 3,
   wherein the third orientation is adjusted such that an interval between directions of adjacent ones of the plurality of sound sources, which are based on the position information, is a given value or more.

5. The non-transitory computer-readable recording medium according to claim 4, the process further comprising:
   executing third sound image localization
   processing that generates, for sound data originated from a similar sound source corresponding to an orientation closest to the first orientation among third orientations of each of the plurality of sound sources, third localization sound data that includes a sound apparently output from an orientation different from the third orientation; and
   outputting the third localization sound data to the terminal to cause the terminal to play back the third localization sound data,
   sensing a change of orientation of the listener during a playback of the third localization sound data,
   specifying, on the basis of the change in orientation of the listener, the sound source in which the listener is interested.

6. The non-transitory computer-readable recording medium according to claim 5,
   wherein the third sound image localization processing generates the third localization sound data such that a direction of the sound gradually moves from the third orientation to the second orientation.

7. An estimation method to be executed by a computer, the estimation method comprising:
   obtaining plural pieces of sound data originated from a plurality of sound sources, each of the plural pieces of sound data being associated with a first location of each of the plurality of sound resources;
   executing first sound image localization processing that generates first localization sound data with which each of the plurality of sound sources is able to be heard by a listener from the first location with respect to each of the plural pieces of sound data;
   executing second sound image localization processing that generates second localization sound data with which each of the plurality of sound sources is able to be heard by the listener as expanding an angle formed by two directions adjacent to each other among directions with respect to each of the plurality of sound sources included in the first localization sound data;

outputting the second localization sound data to a terminal of the listener to cause the terminal to play back the second localization sound data;

sensing an orientation of the listener during a playback of the second localization sound data; and specifying, on the basis of the change in orientation of the listener, at least one of the plurality of sound sources in which the listener is interested.

8. The estimation method according to claim 7, further comprising:

obtaining, after the execution of the second sound image localization processing, first direction information indicating a first orientation of the listener; and specifying a sound source existing in a direction indicated by the first direction information among the plurality of sound sources.

9. The estimation method according to claim 8, further comprising:

obtaining, prior to the execution of the second sound image localization processing, position information indicating a position of the listener; and specifying, on the basis of the position information, a second orientation from the listener for each of the plurality of sound sources, wherein the executing of the second sound image localization processing generates the second localization sound data including a sound apparently output from a third orientation that is different from the second orientation for at least one of the pieces of sound data.

10. The estimation method according to claim 9, wherein the third orientation is adjusted such that an interval between directions of adjacent ones of the plurality of sound sources, which are based on the position information, is a given value or more.

11. The estimation method according to claim 10, further comprising:

executing third sound image localization processing that generates, for sound data originated from a similar sound source corresponding to an orientation closest to the first orientation among third orientations of each of the plurality of sound sources, third localization sound data that includes a sound apparently output from an orientation different from the third orientation; and outputting the third localization sound data to the terminal to cause the terminal to play back the third localization sound data, sensing a change of orientation of the listener during a playback of the third localization sound data, specifying, on the basis of the change in orientation of the listener, the sound source in which the listener is interested.

12. The estimation method according to claim 11, wherein the third sound image localization processing generates the third localization sound data such that a direction of the sound gradually moves from the third orientation to the second orientation.

13. An estimation device comprising:

a memory; and a processor coupled to the memory and configured to:

obtain plural pieces of sound data originated from a plurality of sound sources, each of the plural pieces of sound data being associated with a first location of each of the plurality of sound resources;

execute first sound image localization processing that generates first localization sound data with which each of the plurality of sound;

sources is able to be heard by a listener from the first location with respect to each of the plural pieces of sound data;

execute second sound image localization processing that generates second localization sound data with which each of the plurality of sound sources is able to be heard by the listener as expanding an angle formed by two directions adjacent to each other among directions with respect to each of the plurality of sound sources included in the first localization sound data;

output the second localization sound data to a terminal of the listener to cause the terminal to play back the second localization sound data;

sense an orientation of the listener during a playback of the second localization sound data; and specify, on the basis of the change in orientation of the listener, at least one of the plurality of sound sources in which the listener is interested.

14. The estimation device according to claim 13, wherein the processor is further configured to obtain, after the execution of the second sound image localization processing, first direction information indicating a first orientation of the listener, and wherein the at least one of the plurality of sound sources is a sound source existing in a direction indicated by the first direction information among the plurality of sound sources.

15. The estimation device according to claim 14, wherein the processor is further configured to:

obtain, prior to the execution of the second sound image localization processing, position information indicating a position of the listener, and specify, on the basis of the position information, a second orientation from the listener for each of the plurality of sound sources, and wherein the second sound image localization processing generates the second localization sound data including a sound apparently output from a third orientation that is different from the second orientation for at least one of the pieces of sound data.

16. The estimation device according to claim 15, wherein the third orientation is adjusted such that an interval between directions of adjacent ones of the plurality of sound sources, which are based on the position information, is a given value or more.

17. The estimation device according to claim 16, wherein the processor is further configured to:

execute third sound image localization processing that generates, for sound data originated from a similar sound source corresponding to an orientation closest to the first orientation among third orientations of each of the plurality of sound sources, third localization sound data that includes a sound apparently output from an orientation different from the third orientation, output the third localization sound data to the terminal to cause the terminal to play back the third localization sound data, sense a change of orientation of the listener during a playback of the third localization sound data, and specify, on the basis of the change in orientation of the listener, the sound source in which the listener is interested.

18. The estimation device according to claim 17, wherein the third sound image localization processing generates the third localization sound data such that a direction of the sound gradually moves from the third orientation to the second orientation.

* * * * *